(12) United States Patent
Bushnell et al.

(10) Patent No.: US 11,520,550 B1
(45) Date of Patent: Dec. 6, 2022

(54) ELECTRONIC SYSTEM FOR PRODUCING A COORDINATED OUTPUT USING WIRELESS LOCALIZATION OF MULTIPLE PORTABLE ELECTRONIC DEVICES

(71) Applicant: Apple Inc., Cupertino, CA (US)

(72) Inventors: Tyler S. Bushnell, Mountain View, CA (US); Erik G. de Jong, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/843,794

(22) Filed: Apr. 8, 2020

Related U.S. Application Data

(60) Provisional application No. 62/904,400, filed on Sep. 23, 2019.

(51) Int. Cl.
| | | |
|---|---|---|
| *G06F 3/14* | (2006.01) | |
| *H04S 3/00* | (2006.01) | |
| *H04S 7/00* | (2006.01) | |
| *G01S 5/02* | (2010.01) | |
| *G01S 5/14* | (2006.01) | |

(52) U.S. Cl.
CPC .......... *G06F 3/1423* (2013.01); *G01S 5/0221* (2013.01); *G01S 5/14* (2013.01); *H04S 3/008* (2013.01); *H04S 7/303* (2013.01); *H04S 2400/01* (2013.01); *H04S 2400/11* (2013.01)

(58) Field of Classification Search
CPC .......... G01S 5/0221; G01S 5/14; H04S 3/008; H04S 7/303; H04S 2400/01; H04S 2400/11
See application file for complete search history.

(56) References Cited

U.S. PATENT DOCUMENTS

| 7,613,222 B2 * | 11/2009 | Reunamaki | ............... H04L 5/14 375/130 |
| 2015/0084837 A1 * | 3/2015 | Mese | .................... G06F 3/1446 345/1.3 |

* cited by examiner

*Primary Examiner* — Andrew L Sniezek
(74) *Attorney, Agent, or Firm* — Brownstein Hyatt Farber Schreck, LLP

(57) ABSTRACT

Device localization (e.g., ultra-wideband device localization) may be used to provide coordinated outputs and/or receive coordinated inputs using multiple devices. Providing coordinated outputs may include providing partial outputs using multiple devices, modifying an output of a device based on its position and/or orientation relative to another device, and the like. In some cases, each device of a set of multiple devices may provide a partial output, which combines with partial outputs of the remaining devices to produce a coordinated output.

10 Claims, 17 Drawing Sheets

ELECTRONIC SYSTEM FOR PRODUCING A COORDINATED OUTPUT USING WIRELESS LOCALIZATION OF MULTIPLE PORTABLE ELECTRONIC DEVICES

CROSS-REFERENCE TO RELATED APPLICATION(S)

This application is a nonprovisional patent application of and claims the benefit of U.S. Provisional Application No. 62/904,400, filed Sep. 23, 2019 and titled "Multi-Device Coordinated Input and Outputs," the disclosure of which is hereby incorporated herein by reference in its entirety.

FIELD

The described embodiments relate generally to electronic devices. More particularly, the described embodiments relate to providing a coordinated output using multiple devices based on the relative positions and/or orientations of the devices.

BACKGROUND

Multiple electronic devices may cooperate to provide an output, such as a surround sound audio output or a multi-display graphical output. Many traditional electronic devices do not cooperate to produce a coordinated output and also fail to account for the arrangement of the devices with respect to other sources, which may negatively impact the quality of the output.

SUMMARY

Embodiments of the systems, devices, methods, and apparatuses described in the present disclosure are directed to providing coordinated outputs and/or receiving coordinated inputs using multiple devices based on the relative positions and/or orientations of the devices.

Embodiments described herein may include or take the form of an electronic device (e.g., a portable electronic device) that includes an enclosure, a display positioned at least partially within the enclosure, an antenna configured to detect a wireless signal pulse transmitted between the electronic device and an additional electronic device, and a processing unit. The processing unit is configured to receive an input media stream for a coordinated graphical output and analyze the detected wireless signal pulse to determine spatial parameters of the electronic device relative to the additional electronic device. The processing unit may be further configured to determine a partial graphical output based on the input media stream and at least a portion of the set of spatial parameters and cause the partial graphical output to be displayed on the display. The partial graphical output is part of a coordinated graphical output using the electronic device and (at least) the additional electronic device.

In some embodiments, the display is a first display, the partial graphical output is a first partial graphical output, and the processing unit is a first processing unit. The additional electronic device may include a second display and a second processing unit. The second processing unit may be configured to determine a second partial graphical output based on the input media stream and cause the second partial graphical output to be displayed on the second display. The second partial graphical output does not overlap with the first partial graphical output, and the first processing unit is configured to determine the first partial graphical output at least partially based on the second partial graphical output.

In some cases, the processing unit is further configured to determine an orientation of the partial graphical output at least in part based on the orientation of the first display relative to the second display, and display the partial graphical output in accordance with the determined orientation of the partial graphical output.

In some cases, the set of spatial parameters comprises positions of the first and second displays relative to a viewing position. The processing unit may be configured to determine a display scale of the partial graphical output based on the positions of the first and second displays relative to the viewing position such that, from the viewing position, the coordinated graphical output appears consistently sized across the first and second displays.

In some cases, the antenna is a first antenna and the wireless signal pulse is a UWB signal pulse. The electronic device may further comprise a second antenna configured to detect the UWB signal pulse transmitted between the electronic device and the additional electronic device and a third antenna configured to detect the UWB signal pulse transmitted between the electronic device and the additional electronic device. The processing unit may be configured to: determine a first distance between the first antenna and the additional electronic device; determine a second distance between the second antenna and the additional electronic device; determine a third distance between the third antenna and the additional electronic device; determine a direction of a vector from the electronic device to the additional electronic device based on the first distance, the second distance, and the third distance; and determine the partial graphical output at least partially based on the direction of the vector from the electronic device to the additional electronic device.

In some cases, the processor is configured to determine an orientation of the display of the electronic device relative to a display of the additional electronic device based on the first distance, the second distance, and the third distance, and to determine an orientation of the partial graphical output at least partially based on the orientation of the display of the electronic device relative to the display of the additional electronic device.

In some implementations, the electronic device is a first smartphone and the additional electronic device is a second smartphone. The processing unit may be further configured to: determine that the second smartphone is positioned along a left side of the first smartphone; determine that a third smartphone is positioned along a right side of the first smartphone; and output the partial graphical output in accordance with determining that the second smartphone is positioned along the left side of the first smartphone and the third smartphone is positioned along the right side of the first smartphone. The partial graphical output may include a middle portion of the input media stream.

Embodiments described herein may include or take the form of an electronic device that includes an enclosure, a speaker positioned at least partially within the enclosure, an antenna configured to detect one or more wireless signal pulses, and a processing unit. The processing unit may be configured to receive an input media stream for a coordinated audio output and analyze the detected one or more wireless signal pulses to determine a distance between the electronic device and a target listening position for the coordinated audio output. The processing unit may be further configured to determine a partial audio output at least partially based on the input media stream and the distance between the electronic device and the target listening position and cause the partial audio output to be output by the speaker.

Embodiments described herein may include or take the form of a method for providing a coordinated audio output. The method may include the steps of receiving an input media stream for the coordinated audio output and determining a target listening position for the coordinated audio output. The method may further include the steps of identifying a set of devices to provide the coordinated audio output and determining a set of spatial parameters for each of the set of devices using one or more wireless signal pulses. The method may further include the steps of determining a set of virtual source positions at least partially based on the target listening position and determining a set of partial audio outputs comprising a partial output for each device of the set of devices at least partially based on the input media stream, the spatial parameters, and the virtual source positions. The method may further include the step of providing each partial audio output of the set of partial outputs using a respective device of the set of devices to produce the coordinated audio output.

Embodiments described herein may include or take the form of a method for detecting gestures using an electronic device. The method may include the steps of detecting a change of a set of spatial parameters of a wearable electronic device using one or more wireless signal pulses and determining a gesture based on the change of the set of spatial parameters. The method may further include the steps of determining a command to execute in response to the gesture and causing the command to be executed.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
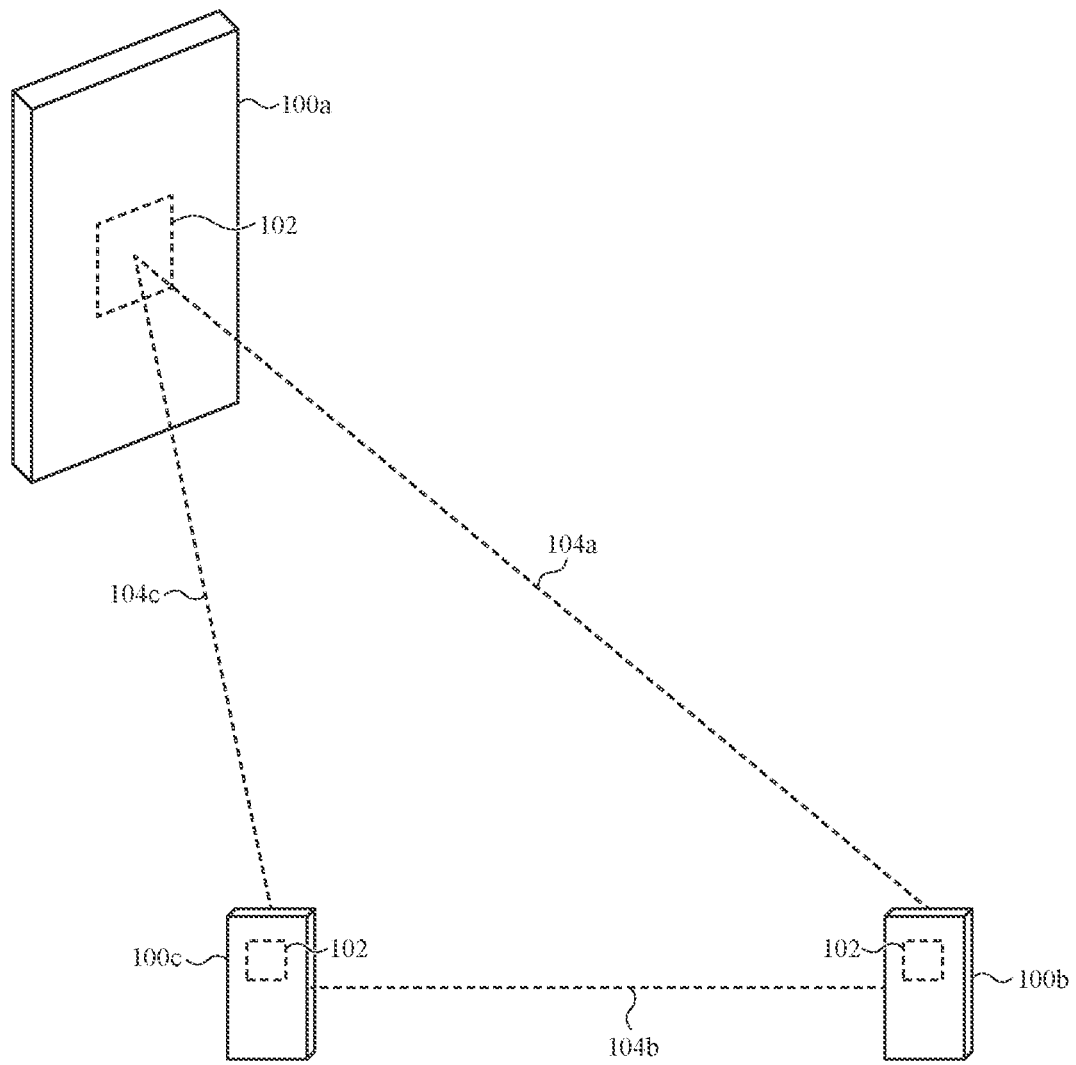
FIGS. 1A-1E show example electronic devices that may be used to perform device localization techniques to provide coordinated outputs, determine coordinated inputs, and detect gestures.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to using device localization to provide a coordinated output using multiple devices. Providing a coordinated output may include providing partial outputs using multiple devices, modifying an output of a device based on its position and/or orientation relative to another device, and other techniques described herein.

In some cases, each device of a set of multiple devices may provide a partial output, which combines with partial outputs of the remaining devices to produce a coordinated output. For purposes of the following disclosure, the terms "coordinated output," "coordinated graphical output," "coordinated audio output," and other similar terms may be used to refer to an audio and/or visual output that is coordinated across multiple devices in order to produce a composite output for a user. The coordinated output may provide a distributed multi-channel (e.g., stereo or surround sound) audio effect, enlarge a viewable area by using multiple displays, or produce other effects, as described herein. As one example, multiple devices may present a coordinated graphical output using displays of the devices. A coordinated graphical output may extend across multiple displays, with each display providing a partial graphical output based on its position and/or orientation relative to the other display(s) and/or reference point(s) (e.g., a viewing position). As another example, multiple devices may present a coordinated audio output using speakers of the devices. Each device of the multiple devices may present partial audio outputs consisting of different parts (e.g., frequencies, channels, etc.) of an audio item based on its position and/or orientation relative to other devices and/or reference point(s) (e.g., a target listening position).

As noted above, coordinated outputs may be provided using device localization. As used herein, "localization" may refer to determining spatial parameters of one or more devices with respect to one another and/or one or more additional devices or reference points. Determining partial outputs to be produced may include determining spatial parameters of the devices with respect to one another and/or one or more additional devices or reference points. As used herein, "spatial parameters" may refer to information about the placement of one or more electronic device(s) with respect to another device or another point of reference.

Spatial parameters may include, without limitation, a set of translational coordinates between two points, a relative orientation between two devices or objects, a position vector having a magnitude (distance) and directional vector, and other positional information relating to the position of a device or object with respect to another device, object, or reference point. Spatial parameters may also include, but are not limited to, any combination of: distances between electronic devices, distances between electronic devices and points of interest (e.g., objects, reference points, etc.), orientations of the electronic devices, positions of electronic devices, and/or any other locating information regarding the electronic device or an associated object. As used herein, "position" or "relative position" of an electronic device may refer to the positional relationship of the electronic device in relation to another device, object, or reference point, and may be expressed as the distance between two objects, in combination with a direction vector indicating a direction from one object to another object. As used herein, "distance" may refer to a measurement of how far apart two points (e.g., electronic devices, other objects, reference points, etc.) are from one another, and may refer to the length of the shortest possible path through space between the two points. The direction between two devices may be a direction component of a vector extending between the two devices (e.g., between center or centroids or other reference points of the devices, displays of the devices, or the like). As used herein, "orientation" may refer to an attitude or angular position of an electronic device (e.g., a tag) with respect to a reference point like a centroid or center of the electronic device or a display thereof, relative to another electronic device (e.g., another tag or a smartphone), other point of interest, or reference frame. Orientation may be designated in terms of a rotation about one or more axes required to rotate from a current placement to a reference placement. Example measures of orientation may include Euler angles, Tait-Bryan angles (e.g., yaw, pitch, and roll), orientation vectors, orientation matrices, and the like. As used herein, "location" may refer to a geographical point where an electronic device, other object, or point of interest is positioned, such as a point on the Earth's surface or elsewhere, and may be designated in terms of a geographic coordinate system (e.g., latitude and longitude) or in terms of a position relative to another geographical point or point of interest.

Broadly, spatial parameters may be determined to perform localization by analyzing wireless signals (e.g., radio frequency signals) sent between two or more electronic devices. The wireless signals used to determine spatial parameters of electronic devices may include ultra-wideband (UWB) signals. As used herein "UWB signals" may refer to signals transmitted over a large portion of the radio spectrum (e.g., having a bandwidth greater than 500 MHz or greater than 20% of a center carrier frequency). Using UWB signals to perform localization may be referred to herein as "UWB localization" or "UWB device localization". Determining spatial parameters using UWB signals may be discussed in more detail with respect to FIGS. 1A-1E below.

In various embodiments, partial outputs and other outputs may be changed in real time or near real time as detected spatial parameters change. Changes of spatial parameters may be detected as they occur (e.g., in real time or in near real time), and modifications to partial outputs may be determined based on those changes. As one example, as the relative positions of electronic devices change relative to one another and/or relative to one or more points of interest, a partial audio or graphical output may change to provide a consistent coordinated output.

In some cases, changes of spatial parameters may be detected as gestures for controlling outputs of one or more electronic devices. For example, a wearable device (e.g., an electronic watch) or a handheld device (e.g., a smartphone) may move in association with gestures (e.g., moving a hand, arm, or other body part) by a user. The movement and/or orientation of the device may be used to detect the gesture(s). The detected gesture(s) may be used to control an output and/or provide other inputs to the device or another device. As one example, a user wearing an electronic watch may point at a graphical object on a display and cause the graphical object to move according to movement of the user's hand or arm.

In some cases, a virtual or augmented reality device may display, as part of a virtual environment, a graphical object having a position and/or orientation within the virtual environment that corresponds to an actual position and/or orientation of another electronic device. An output of the virtual or augmented reality device may be changed as spatial parameters change. For example, the graphical object may be modified or moved based on a change in the relative position and/or orientation of the first device and the second device.

Device localization techniques may be used to combine inputs from multiple devices. As one example, multiple synchronous audio inputs may be combined based on the relative positions and/or orientations of the devices capturing the audio inputs, for example to create a multi-channel audio item. As another example, multiple visual items (e.g., images or videos) may be combined based on the relative positions and/or orientations of the devices capturing the visual items, for example to create 3-dimensional models, stitched images, and the like.

Device localization techniques may be used to identify directionality and/or positions of audio sources, image subjects, and other objects relative to devices capturing audio, images, and other inputs. As one example, device localization may be used to determine directions and/or positions of one or more capture devices capturing data (e.g., images, audio, video, or other data) relative to one or more sources of the data. As another example, device localization may be used to determine a distance between a camera and an object to refine focus settings of the camera. As still another example, device localization techniques may be combined with other signals to determine a map or 3-dimensional model of one or more spaces or objects, such as a room or building map or model.

These and other embodiments are discussed with reference to FIGS. 1A-12. However, those skilled in the art will readily appreciate that the detailed description given herein with respect to these figures is for explanatory purposes only and should not be construed as limiting.

FIG. 1A shows example electronic devices 100a, 100b, 100c that may be used to perform device localization techniques to provide functionality described herein, including providing coordinated outputs, determining coordinated inputs, detecting gestures, and the like. Broadly, wireless signals (e.g., radio frequency signals) sent between electronic devices 100a, 100b, 100c, may be analyzed to perform device localization of the devices. As noted above, performing device localization may include determining spatial parameters, including but not limited to, any combination of distances 104a, 104b, 104c between the electronic devices 100a, 100b, 100c, distances between the electronic devices 100a, 100b, 100c and points of interest, orientations of the electronic devices 100a, 100b, 100c, positions of the electronic devices 100a, 100b, 100c, and locations of the electronic devices 100a, 100b, 100c. Three electronic devices 100a, 100b, 100c are shown in FIG. 1A for purposes of illustration. In various embodiments, fewer or more electronic devices may be used to perform device localization techniques to provide functionality described herein. In accordance with some embodiments, one or more of the electronic device 100a, 100b, 100c may be a device that is not adapted or configured to produce a partial output and may be a device that provides localization for another device that is adapted or configured to produce a partial output. In some cases, one or more of the electronic devices 100a, 100b, 100c is a wireless tag or accessory that is configured to perform the localization techniques described herein but is not adapted to produce a partial output that is part of a coordinated output produced by a set of electronic devices.

The electronic devices 100a, 100b, 100c may be operably coupled to one another and configured to communicate with one another to provide coordinated outputs. The electronic devices 100a, 100b, 100c may be capable of exchanging information regarding device information, device localization, and/or input media streams for providing coordinated outputs. In some cases, the electronic devices 100a, 100b, 100c communicate with one another to determine whether each device will provide a partial output of a coordinated output, as discussed in more detail below with respect to FIG. 2. As used herein, "operably coupled" or "electrically coupled" may be used to refer to two or more devices that are coupled in any suitable manner for operation and/or communication, including electrically wired, wirelessly, or some combination thereof. The term "coupled," as used herein, may be used to refer to two or more elements, structures, objects, components, parts, or the like that are physically attached to one another, operate with one another, communicate with one another, are in electrical connection with one another, and/or otherwise interact with one another.

In some cases, one or more devices of a group of devices is designated as a master device to perform group-level processing activities. For example, the electronic device 100a may be designated as a master device and may determine which devices to use to provide a coordinated output, receive an input media stream to provide for the coordinated output, determine partial outputs for each device to provide, facilitate communication among the devices, and the like. Master devices may be selected by a user, chosen automatically, or otherwise selected to perform group-level processing. For example, a master device may be designated as a device at which a user initiates providing a coordinated output. In some cases, a master device provides a partial output as part of a coordinated output. In some cases, a master device does not provide a partial output as part of a coordinated output.

As noted above, performing device localization may include analyzing wireless signals sent between two or more of the electronic devices 100a, 100b, 100c. The wireless signals used to determine spatial parameters of electronic devices may include ultra-wideband (UWB) signals, which may refer to signals transmitted over a large portion of the radio spectrum (e.g., having a bandwidth greater than 500 MHz or greater than 20% of a center carrier frequency).

The electronic devices 100a, 100b, 100c may be configured as transmitting devices configured to transmit UWB signals, receiving devices configured to detect UWB signals, or both. Each device may include one or more antennas 102 coupled to an enclosure of the device for transmitting and/or detecting UWB signals. A UWB signal transmitted by a transmitting device propagates in all directions or in one or more directions from a transmitting device, and the transmitted signal may be detected by one or more receiving devices. UWB signals used to determine spatial parameters of electronic devices may be sent as pulses. As used herein, a "pulse," may refer to a rapid, transient change in the amplitude and/or signal strength of a signal from a baseline value to a higher or lower value, followed by a rapid return to the baseline value.

As noted above, UWB signals may be used to determine a distance (e.g., distance 104a, 104b, or 104c) between two electronic devices. In particular, UWB signals may be used to determine a distance between a receiving device and a transmitting device. As noted above, a distance between a receiving device and a transmitting device may refer to a measurement of how far apart the receiving device and the transmitting device are from one another, and may refer to the length of the shortest possible path through space between the receiving device and the transmitting device.

The receiving device or a device operably coupled to a receiving device may analyze a wireless signal pulse (e.g., a UWB signal pulse) detected by an antenna 102 of the receiving device to determine the distance 104a, 104b, or 104c between the receiving device and a transmitting device that transmitted the wireless signal pulse. In particular, the receiving device may determine a time of flight (TOF) of the wireless signal pulse and multiply the TOF by the propagation speed of the wireless signal pulse (e.g., the speed of light) to determine or estimate the distance 104a, 104b, or 104c between the transmitting device and the receiving device.

The TOF may be determined by calculating the difference between the transmission time (e.g., the time the signal was transmitted) and the detection time (e.g., the time the signal was detected) (also called the time of arrival (TOA)). The transmission time may be included in the detected wireless signal pulse, sent as part of a separate transmission, or known as a result of a previously performed synchronization process between the transmitting device and the receiving device.

Using UWB signals for determining distance may provide numerous advantages, including increased precision in determining TOA and/or TOF. As one example, UWB signals may have shorter wavelengths than other signals, which may mean that the arrival time may be more accurately determined. This reduces errors in determining TOA and TOF, which results in more accurate distance estimation.

A single signal may be detected by multiple receiving devices and/or multiple antennas of a single receiving device, and the signal may be used as described above to determine distances between the transmitting device and each receiving device or antenna. For example, any of the electronic devices 100a, 100b, 100c may transmit a UWB signal that is detected by the other two electronic devices. Additionally, multiple signals from different transmitting devices may be detected by a single receiving device, and the signals may be used as described above to determine distances between the receiving device and each transmitting device. For example, any of the electronic devices 100a, 100b, 100c may receive UWB signals that are transmitted by the other two electronic devices.

Figure 1B:
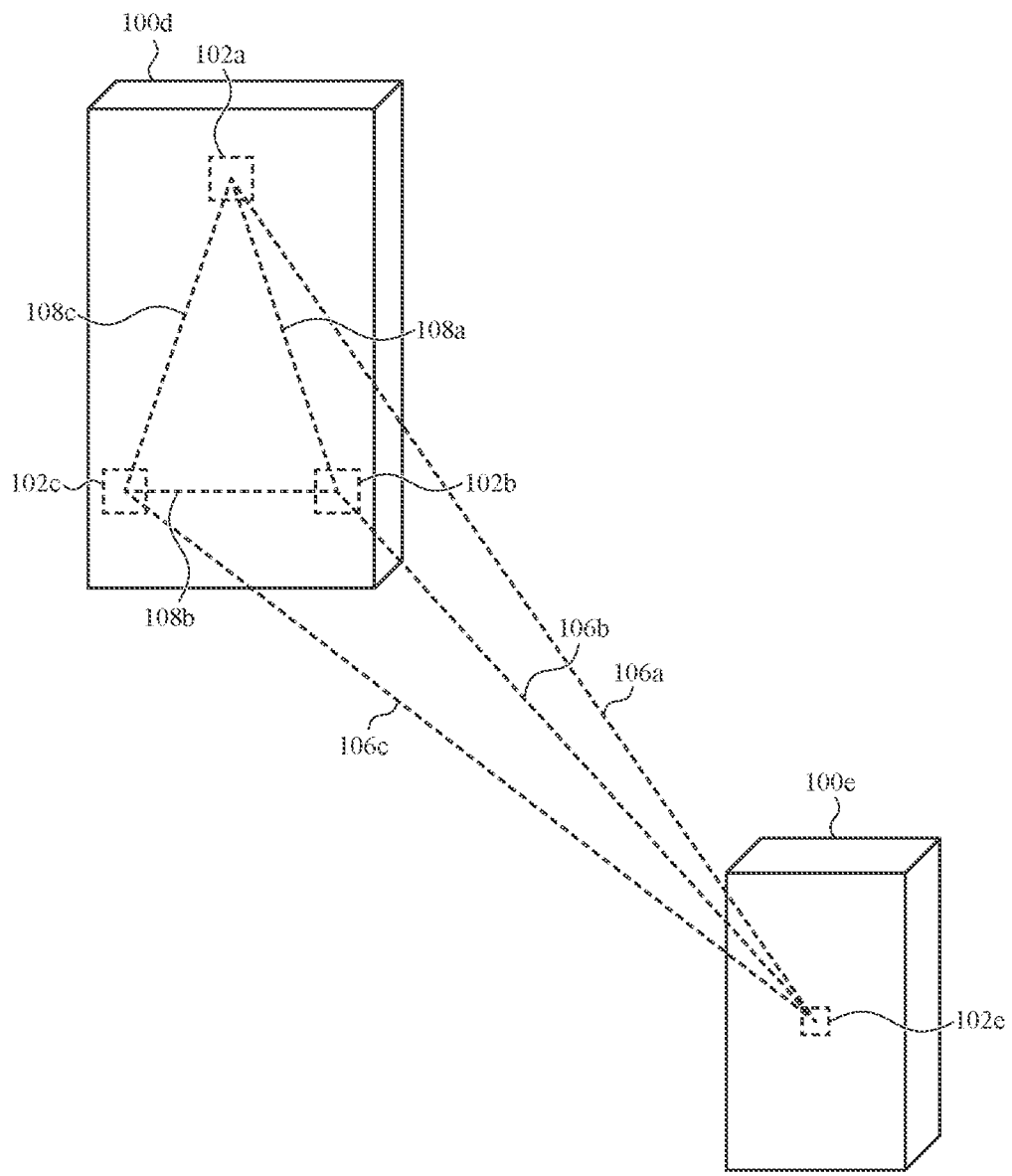
Figure 1C:
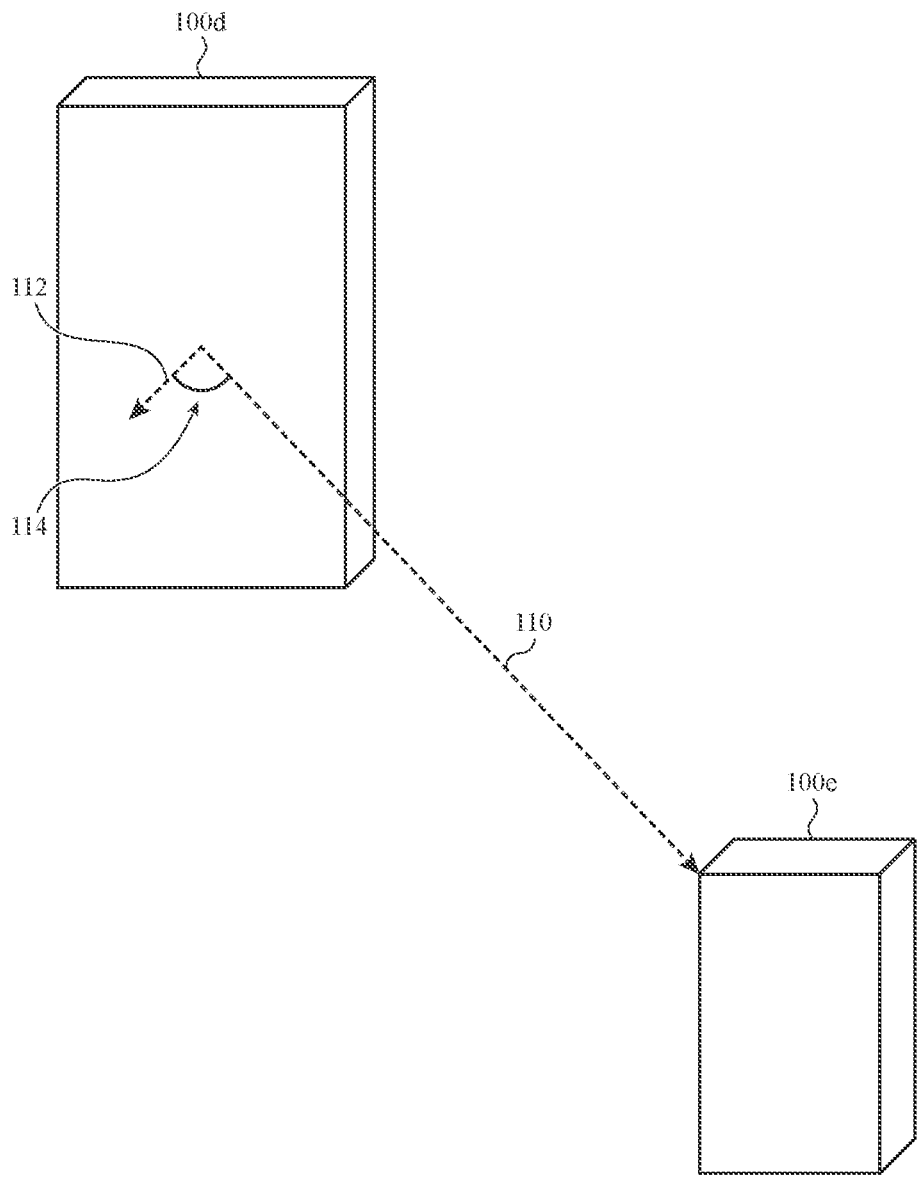

As noted above, UWB signals may be used to determine an orientation of an electronic device relative to a point of interest (e.g., an electronic device, an object, a reference point, etc.). Turning to FIG. 1B, UWB signals may be used to determine an orientation of a receiving device 100d relative to a transmitting device 100e. As used herein, the term "orientation" may refer to an attitude or angular position of an electronic device relative to another electronic device, other point of interest, or reference frame. Orientation may be designated in terms of a rotation about one or more axes required to rotate from a current placement to a reference placement. Example measures of orientation may include Euler angles, Tait-Bryan angles (e.g., yaw, pitch, and roll), orientation vectors, orientation matrices, and the like. The orientation of an electronic device relative to a point of interest may also be thought of as a direction to the point of interest with respect to the electronic device.

The receiving device 100d (or a device operably coupled to a receiving device) may analyze a wireless signal pulse detected by multiple antennas 102a, 102b, 102c of the receiving device to determine an orientation of the receiving device relative to the transmitting device 100e that transmitted the wireless signal pulse. As noted above, receiving devices may include multiple antennas. As one example, as shown in FIG. 1B, the receiving device 100d may include three or more antennas (e.g., antennas 102a, 102b, 102c) positioned on or within the receiving device. The receiving device may determine distances 106a, 106b, and 106c between each antenna and an antenna 102e of the transmitting device 100e as described above with respect to FIG. 1A. Differences between the distances 106a, 106b, 106c may indicate the orientation of the receiving device 100d relative to the transmitting device 100e.

Using the determined distances 106a, 106b, 106c and known separation distances 108a, 108b, and 108c between the antennas 102a, 102b, 102c, a vector 110 (shown in FIG. 1C) extending from the receiving device 100d to the transmitting device 100e may be determined. The vector 110 may be expressed in terms of a distance between the receiving device 100d and the transmitting device 100e and a direction of the vector 110 relative to a reference vector of the receiving device (e.g., a vector 112 that is normal to a plane shared by the three antennas or any other vector that is fixed with respect to the three antennas). The direction of the vector 110 may be described with reference to an angle 114 between the vector 110 and the vector 112. The direction of the vector 110 may describe the orientation of the receiving device 100d relative to the transmitting device 100e.

In some cases, the direction of the vector 110 may be determined independently of determining the distances 106a, 106b, 106c. The receiving device 100d may determine a direction from the receiving device 100d to the transmitting device 100e (or vice versa) by determining a time difference of arrival (TDOA) of the same wireless signal pulse to the three separate antennas 102a, 102b, 102c of the receiving device. The TDOA for a wireless signal pulse may be determined as the pairwise time difference between the time of arrival of the signal at a first antenna (e.g., antenna 102a) and the time of arrival of the signal at a second antenna (e.g., antenna 102b). One or more pairwise time differences may be determined, and may be used to determine a direction from the receiving device 100d to the transmitting device 100e, which, as noted above, may describe the orientation of the receiving device relative to the transmitting device. Other methods for determining direction and orientation may also be used, including triangulation, phase difference of arrival (PDOA), and hybrid TDOA/PDOA methods.

The distance and direction between the receiving device 100d and the transmitting device 100e may define a position of the receiving device relative to the transmitting device. As used herein, "position" or "relative position" of an electronic device may refer to the positional relationship of the electronic device in relation to another device, object, or reference point, and may be expressed as the distance between the electronic device and another object or point of interest (e.g., a distance between a receiving device 100d and a transmitting device 100e), in combination with a direction vector indicating a direction from the electronic device and the other object or point of interest. For example, the vector 110 of FIG. 1C may represent a relative position of the receiving device 100d and the transmitting device 100e.

In various embodiments, UWB localization techniques may be combined with additional sources of information to determine spatial parameters. The electronic devices described herein may include or be operably coupled to one or more sensors or devices that may be used, either alone or in conjunction with UWB localization, to determine spatial parameters. Examples of sensors and devices include magnetometers, gyroscopes, accelerometers, optical sensors, cameras, global positioning system (GPS) receivers, and the like.

As one example, the receiving device 100d (and/or the transmitting device 100e) may include or be operably coupled to a GPS receiver configured to determine a location of the receiving device 100d. As noted above, as used herein, "location" may refer to a geographical point where an electronic device is positioned, such as a point on the Earth's surface or elsewhere, and may be designated in terms of a geographic coordinate system (e.g., latitude and longitude) or in terms of a position relative to another geographical point or point of interest. The position of a transmitting device relative to a receiving device may be determined using UWB localization. A location of the transmitting device 100e may be determined using a location of the receiving device 100d determined using GPS and the position of the transmitting device 100e relative to the receiving device 100d determined using UWB localization.

As another example, the receiving device 100d (and/or the transmitting device 100e) may include or be operably coupled to a magnetometer or an accelerometer that may be used to determine an orientation of the receiving device 100d relative to the earth. For example, a magnetometer may be used to determine an orientation of the receiving device 100d relative to magnetic north or another known source of magnetic flux. Similarly, an accelerometer may be used to determine an orientation of the receiving device 100d relative to the direction of gravitational acceleration (e.g., inward with respect to the earth's surface). A direction from the receiving device 100d to the transmitting device 100e may be determined using UWB localization as discussed above. The direction from the receiving device 100d to the transmitting device 100e relative to the earth or another known point of interest may be determined by combining the orientation of the receiving device 100d relative to the earth determined using a magnetometer or accelerometer with the direction from the receiving device 100d to the transmitting device 100e relative to the receiving device determined using UWB localization.

Figure 1D:
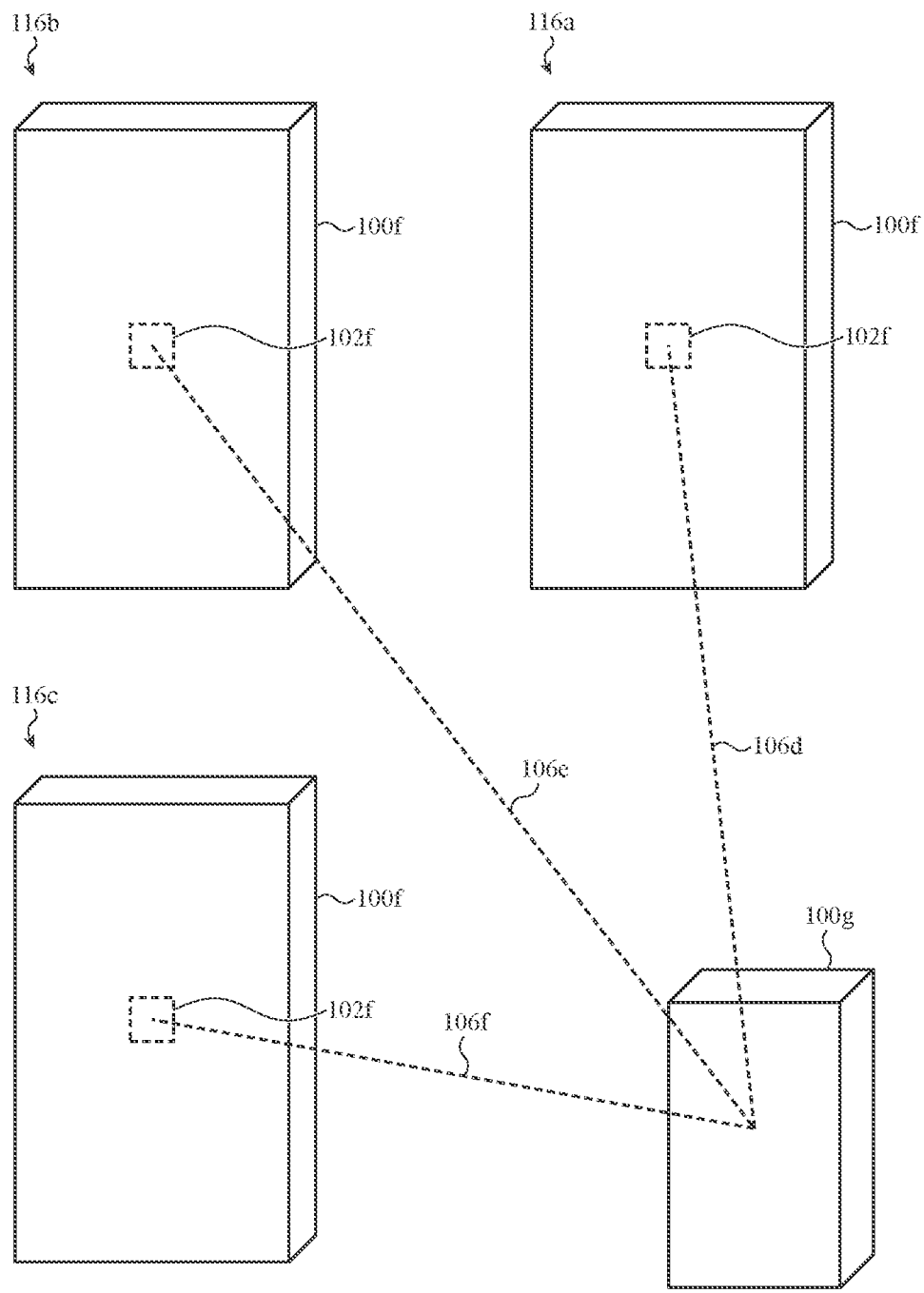

A position and/or location of a transmitting device may also be determined by a receiving device by determining a distance between the receiving device and the transmitting device when the receiving device is at multiple different positions. This process triangulates the position and/or location of the transmitting device using a pulse from the transmitting device, but without using multiple onboard antennas and TDOA methods. FIG. 1D illustrates how the position and/or location of a receiving device 100f is determined using this technique (which may be referred to as "synthetic aperture").

As described above, the transmitting device 100g may emit a wireless signal pulse (e.g., a UWB signal pulse) that is detectable by an antenna 102f, and the receiving device 100f may analyze the pulse (e.g., using TOF) to determine the distance from the receiving device 100f to the transmitting device 100g. As shown in FIG. 1D, in order to determine the position and/or location of the transmitting device 100g, the receiving device 100f may determine multiple distances (e.g., distances 106d, 106e, and 106O to the transmitting device 100g when the receiving device 100f is at multiple locations (e.g., 116a, 116b, and 116c). Because the location of the receiving device 100f at locations 116a, 116b, and 116c is known (as determined by an onboard GPS, accelerometer(s), and/or other positioning systems) and the distances between the receiving device 100f and the transmitting device 100g are also known, the receiving device 100f can determine, using triangulation, the location of the transmitting device 100g. Further, using an onboard magnetometer, accelerometer, and/or other systems, the receiving device 100f can determine its orientation relative to the determined location of the transmitting device 100g. The orientation of the receiving device 100f relative to the transmitting device 100g together with the location of the transmitting device 100g provides spatial parameters of the transmitting device 100g to facilitate the functionalities described herein.

With reference to the process described in FIG. 1D, the transmitting device's location may be determined once the receiving device 100f determines at least three distance measurements between the receiving device 100f and the transmitting device 100g. In some cases, once the location of the transmitting device is established using at least three distance measurements, the receiving device 100f may perform more distance measurements at additional locations of the receiving device 100f. These subsequent measurements may be used to refine and/or update the determined location of the transmitting device 100g, or otherwise to improve the accuracy of the location determination.

In accordance with some embodiments, one or more of the electronic devices described with respect to FIGS. 1A-1D, above, may be a device that is not adapted or configured to produce a partial output and may be a device that provides localization for another device that is adapted or configured to produce a partial output. In some cases, one or more of the electronic devices is a wireless tag or accessory that is configured to perform the localization techniques described herein but is not adapted to produce a partial output that is part of a coordinated output produced by a set of electronic devices. Such a device may determine location information, including a set of spatial parameters, which may be relayed to a separate device that is adapted to produce a partial output. The spatial parameters may include localization data of the wireless tag or accessory with respect to another device, object, or reference point. The spatial parameters may also include relative localization data between the wireless tag or accessory and the device that is configured to produce the output. The wireless tag or accessory may also relay location information to multiple electronic devices that are configured to produce respective partial outputs.

Figure 1E:
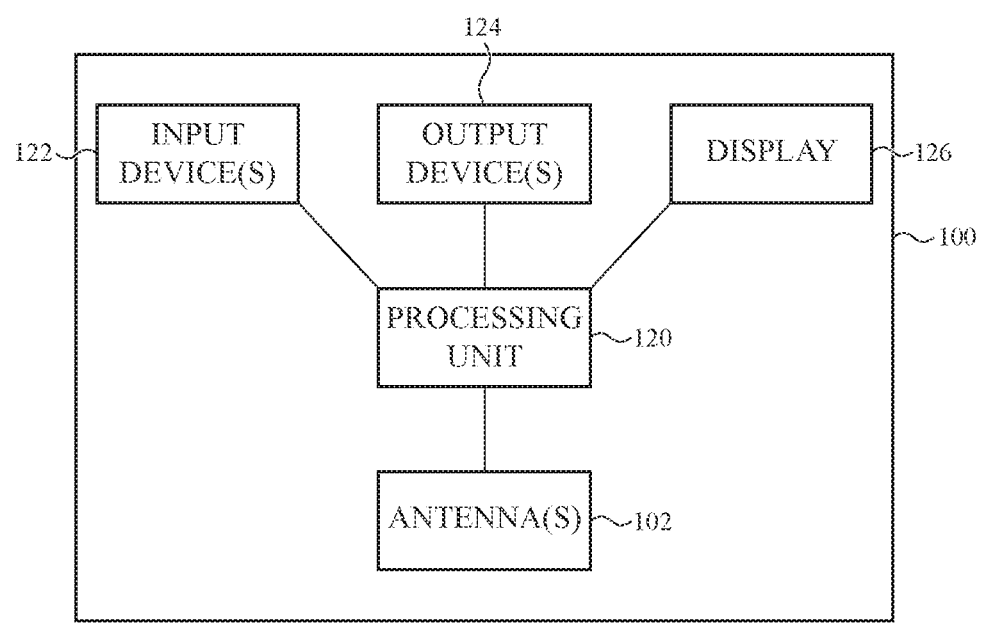

FIG. 1E shows a block diagram of an example electronic device 100 that may be used to perform device localization as described herein. As noted above, the electronic device 100 may include one or more antennas 102, a processing unit 120, a display 126, one or more input devices 122, and one or more output devices 124 positioned at least partially within a device enclosure.

The electronic device 100 may take the form of any suitable electronic device or combination of devices, including smartphones, home control devices, wearable electronic devices, timekeeping devices, health monitoring or fitness devices, portable computing devices, mobile phones (including smartphones), tablet computing devices, desktop computing devices, digital media players, virtual reality devices, audio devices (including home audio devices, earbuds, and headphones), wireless tags, accessories, cameras, sensing devices, and the like. The electronic device examples described herein may be characterized as portable electronic devices, mobile electronic devices, and/or personal electronic devices.

The antenna(s) 102 may be used to send signals to other devices and/or receive signals from other devices. The antenna(s) 102 may be used for device localization and/or other communication activities, and may include separate and/or shared antennas for near-field wireless communications protocols, UWB protocols, Bluetooth, WiFi, cellular protocols, or the like. The antenna(s) 102 may be attached to and/or integral to one or more components of the electronic device 100, such as an enclosure or frame. In some cases, one or more antennas 102 may be used for performing UWB localization as discussed above. In some cases, the same antenna(s) are used for transmitting and detecting UWB signals. In some cases, the antenna(s) used for transmitting UWB signals are different from the antenna(s) used for detecting UWB signals. The antenna(s) may be operably coupled to one or more transmitters, receivers, processing units, or the like that may be used to generate transmitted signals and/or process detected signals.

In various embodiments, the display 126 may be positioned at least partially within an enclosure of the electronic device 100. The display 126 provides a graphical output, for example associated with an operating system, user interface, and/or applications of the electronic device 100. In one embodiment, the display 126 includes one or more sensors and is configured as a touch-sensitive (e.g., single-touch, multi-touch) and/or force-sensitive display to receive inputs from a user. The display 126 is operably coupled to the processing unit 120 of the electronic device 100. In some cases, the graphical output of the display 126 is visible along at least a portion of an external surface of the electronic device 100.

In various embodiments, a graphical output of the display 126 is responsive to inputs provided at the display and one or more additional input devices 122. For example, the processing unit 120 may be configured to modify the graphical output of the display 126 in response to determining an electrocardiogram, receiving rotational inputs, receiving translational inputs, or receiving touch inputs. The processing unit 120 may include a graphical processing unit (GPU) that is able to perform graphics transformations, including translational modifications, rotational modifications, dynamic reorientations, and other graphical computations and manipulations.

In some cases, a haptic output provided by the electronic device 100 corresponds to the graphical output of the display 126. In some cases, the electronic device 100 may produce a haptic output that is coordinated with a change in the graphical output of the display 126. For example, the haptic output may be produced at or near the same time as the change in the graphical output of the display 126. In some cases, a time that the haptic output is produced overlaps a time that the graphical output of the display 126 changes.

The display 126 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 126 is positioned beneath and viewable through the cover. The display 126 and/or the output device 124 may be optional, depending on the implementation of the device.

Broadly, the input devices 122 may detect various types of input, and the output devices 124 may provide various types of output. The processing unit 120 may be operably coupled to the input devices 122 and the output devices 124. The processing unit 120 may receive input signals from the input devices 122, in response to inputs detected by the input devices. The processing unit 120 may interpret input signals received from one or more of the input devices 122 and transmit output signals to one or more of the output devices 124. The output signals may cause the output devices 124 to provide one or more outputs. The output devices 124 may include, for example, one or more audio output devices (e.g., speakers) positioned at least partially within an enclosure of the electronic device 100.

Detected input at one or more of the input devices 122 may be used to control one or more functions of the electronic device 100. In some cases, one or more of the output devices 124 may be configured to provide outputs that are dependent on, or manipulated in response to, the input detected by one or more of the input devices 122. The outputs provided by one or more of the output devices 124 may also be responsive to, or initiated by, a program or application executed by the processing unit 120 and/or an associated companion device. Examples of suitable processing units, input devices, output devices, and displays, are discussed in more detail below with respect to FIG. 12.

As noted above, UWB localization techniques may be combined with additional sources of information to determine spatial parameters. The input devices 122 may include or be operably coupled to one or more sensors or devices that may be used, either alone or in conjunction with UWB localization, to determine spatial parameters. Examples of sensors and devices include magnetometers, gyroscopes, accelerometers, optical sensors, cameras, global positioning system (GPS) receivers, and the like.

As noted above, device localization may be used to provide coordinated outputs using multiple electronic devices. As noted above, each device of a set of multiple devices may provide a partial output, which combines with partial outputs of the remaining devices to produce a coordinated output.

Figure 2:
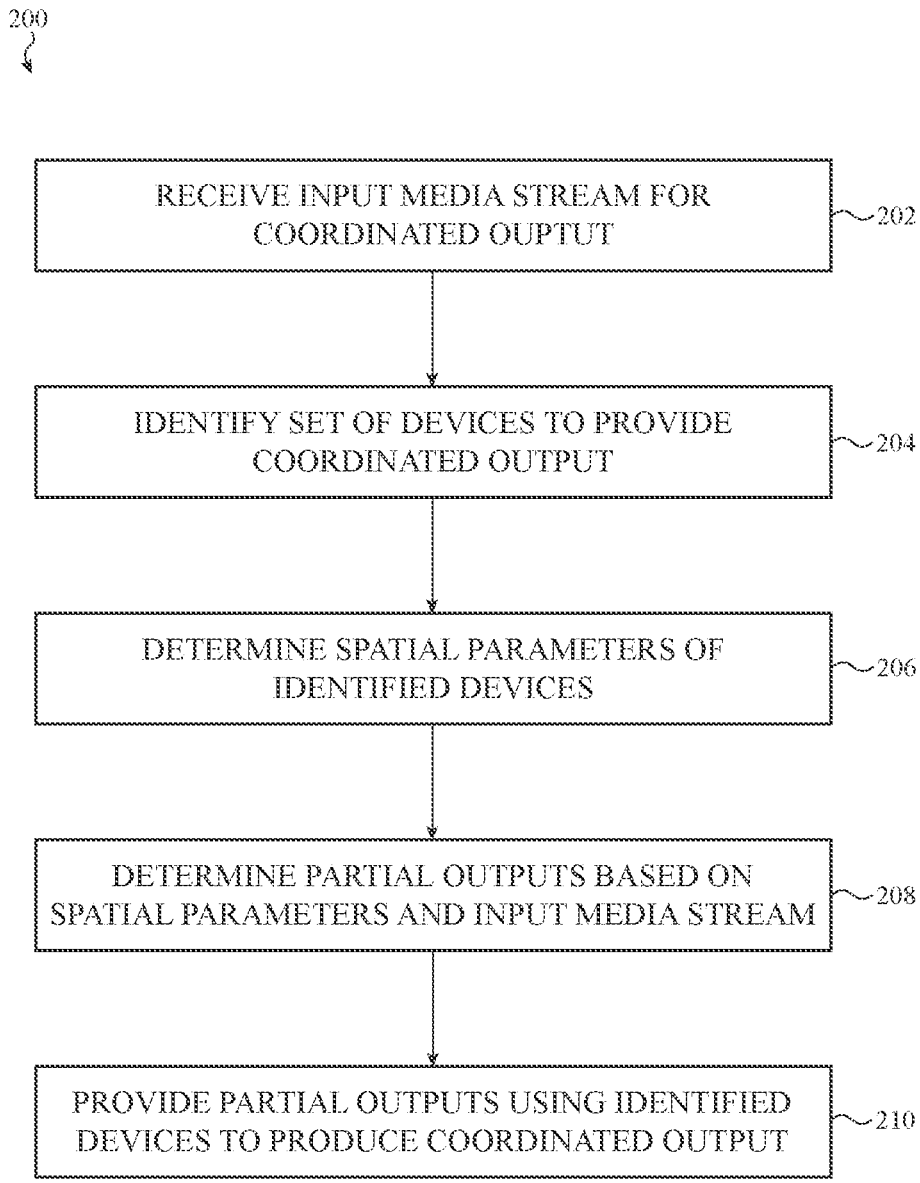
FIG. 2 shows a flowchart of an example method for providing a coordinated output by providing partial outputs using multiple devices.

FIG. 2 shows a flowchart of an example method 200 for providing a coordinated output by providing partial outputs using multiple devices. At operation 202, an input media stream for providing a coordinated output is received. As noted above, the input media stream may be received by a master device designated to perform group-level processing activities. In some cases, the input media stream may be received by multiple devices of a set of devices for providing a coordinated output. In some cases, the input media stream may be determined based on a user selection, such as via a graphical user interface of an electronic device.

The input media stream may include streaming video, streaming audio, streaming web conference with or without accompanying audio, or other graphical and/or audio streams (e.g., video games, etc.). The coordinated outputs may be a representation of the input media stream, including but not limited to, an enlarged display of streaming video or other graphical content using multiple display devices, a spatially distributed audio/video broadcast that is enabled by multiple devices distributed in a room or other shared space, or the like. Coordinated outputs may include, but are not limited to, coordinated graphical outputs, coordinated audio outputs, coordinated visual outputs, coordinated haptic outputs, or some combination thereof. Coordinated outputs may be a combination of multiple partial outputs that may be non-overlapping or partially overlapping outputs. The coordinated output may also be supplemented with additional content not in the original input stream.

At operation 204, a set of devices for providing the coordinated output is identified. One or more electronic devices (e.g., a master device) may identify the devices for providing the coordinated output. One or more electronic devices (e.g., the master device) may communicate with nearby devices to determine which devices are available to provide the coordinated output. In some cases, determining devices that are nearby may include performing device localization (e.g., UWB localization) techniques, such as identifying devices that are within a threshold distance of the master device or another reference point. For example, a master device may determine a distance between one or more nearby devices.

A master device may send requests to nearby devices to participate in providing the coordinated output. The requests may be automatically accepted or denied, or the requests may prompt a user to accept or deny the request, for example via a graphical user interface of the device. In some cases, nearby devices may be automatically identified as devices in the set of devices for providing the coordinated output, for example as a result of having been previously configured to participate in providing coordinated outputs. In some cases, devices for providing the coordinated output may be manually selected by a user from a list of the identified nearby devices.

In various embodiments, the set of devices for providing the coordinated output may be updated as a coordinated output is provided. For example, devices that become farther than the threshold distance from one or more other devices (e.g., a master device), viewing positions, target listening positions, or the like may be removed to the set of devices for providing the coordinated output. Additionally or alternatively, devices that become closer than the threshold distance from one or more other devices (e.g., a master device), viewing positions, target listening positions, or the like may be added to the set of devices for providing the coordinated output. Devices may become farther than or closer than the threshold distance based on movement of the device, other device(s), movement or changes of viewing or target listening positions, and/or changes of the threshold distance.

At operation 206, a set of spatial parameters for each of the identified devices is determined. As described in more detail above with respect to FIGS. 1A-1E, determining spatial parameters may include performing device localization techniques, such as UWB localization techniques. Wireless signal pulses (UWB signal pulses) received by the devices in the set of devices may be analyzed to determine the spatial parameters. In some cases, determining spatial parameters includes determining relative positions (e.g., distances and directions) of each device participating in providing the coordinated output. In various embodiments, each device may determine one or more spatial parameters regarding itself or another device. The determined spatial parameters may be communicated to one or more other electronic devices, such as the master device.

As discussed previously, the spatial parameters may also be determined using a device that is not configured to produce a respective portion of the coordinated output. For example, one or more sets of spatial parameters of the devices configured to produce a partial output may be determined using a separate device having an antenna and circuitry adapted to perform one or more of the wireless localization techniques described above. The separate device may be a separate computing system, a wireless tag, a wireless accessory, a wireless locating device, or other type of electronic device. In some cases, the separate device is configured to relay one or more sets of spatial parameters to each of the devices configured to produce the partial output, including the master device.

At operation 208, a set of partial outputs for each device is determined based on the spatial parameters and the input media stream. One or more electronic devices (e.g., the master device) may determine partial outputs for each device in the set of devices. In various embodiments, the partial outputs may include parts of the input media stream determined based on the spatial parameters (e.g., the relative positions) of the electronic devices providing the coordinated output. Partial outputs may include regions or parts of graphical outputs, channels, frequency components, and the like of audio outputs, and the like. Partial outputs are discussed in more detail below with respect to FIGS. 4-7.

At operation 210, the partial outputs are provided at each identified device to produce the coordinated output. Each determined device may produce its partial output such that, when combined with the partial outputs produced by the other devices, each determined device produces the coordinated output. In some cases, the partial outputs are coordinated (e.g., determined, synchronized, etc.) by one of the devices of the determined devices. In some cases, the partial outputs are independently coordinated without a central or controlling device doing the coordination.

Figure 3:
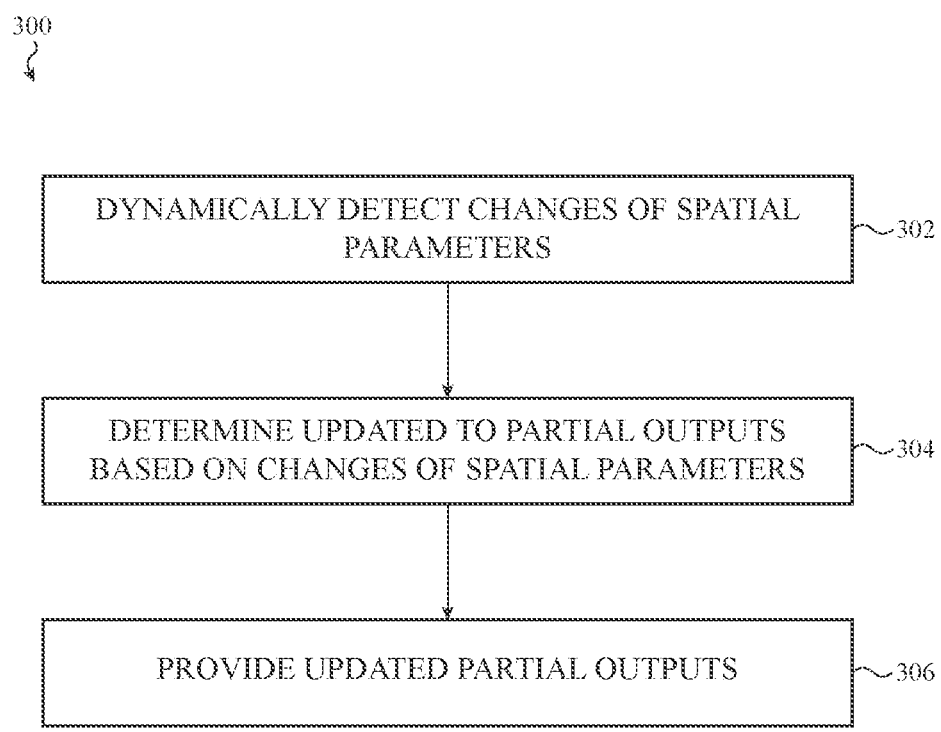
FIG. 3 shows a flowchart of an example method for dynamically modifying partial outputs based on detected changes of spatial parameters.

In some cases, the partial outputs provided to produce a coordinated output may be dynamically updated (e.g., in real time or in near real time) as the spatial parameters of the electronic devices providing the coordinated output change. FIG. 3 shows a flowchart of an example method 300 for dynamically modifying partial outputs based on detected changes of spatial parameters. The method 300 may be performed in conjunction with the method 200, for example after operations 208 and/or 210.

At operation 302, changes of spatial parameters are dynamically detected. As described in more detail above with respect to FIGS. 1A-1E, determining spatial parameters may include performing device localization techniques, such as UWB localization techniques. Multiple wireless signals (e.g., UWB pulses) may be sent between devices to determine changes of spatial parameters. A first UWB pulse received by an electronic device may be used to determine first spatial parameters for the electronic device, and a second UWB pulse received by the electronic device may be used to determine second, updated spatial parameters for the electronic device. As one example, a first UWB pulse received by an electronic device may be used to determine an initial position and/or orientation of the electronic device, and a second UWB pulse received by the electronic device may be used to determine a subsequent position and/or orientation of the electronic device. The electronic device may determine differences between the initial position and/or orientation and the subsequent position and/or orientation to determine the changes of the spatial parameters.

The wireless signals may be sent at predetermined intervals and/or according to motion detected by other sensors of the electronic device(s) to determine changes of spatial parameters in real time or near real time (e.g., as the changes occur or shortly thereafter). In various embodiments, each device may dynamically determine one or more changes of spatial parameters regarding itself or another device. The detected changes of the spatial parameters may be communicated to one or more other electronic devices, such as a master device. The updated spatial parameters may be detected at regular intervals. The intervals may be less than one second, less than 500 milliseconds, less than 100 milliseconds, or shorter. In some cases, the intervals are tied to a property of an input media stream, such as a frame rate. For example, the spatial parameters may be updated a same number of times per second as a frame rate (e.g., update spatial parameters 24 times per second for a frame rate of 24 frames per second).

At operation 304, updated partial outputs (e.g., modifications to the partial outputs and/or new partial outputs) are determined based on the detected changes of spatial parameters. An updated portion of a graphical output that makes up a partial graphical output may be determined in accordance with a detected change of spatial parameters. Similarly, the frequency components or channels that make up a partial audio output may change. Modifications to partial outputs may be determined in response to determining changes of spatial parameters, at regular intervals, or some combination thereof.

At operation 306, the updated partial outputs may be provided by one or more devices of a set of devices for providing the coordinated output. A master device may communicate updated partial outputs to one or more devices providing the coordinated output and cause the devices to output the modified or new partial outputs. The steps of the method 300 may be performed on an ongoing basis during production of a coordinated output to dynamically update the partial outputs based on changes of the spatial parameters.

The methods 200, 300 are example methods for producing coordinated outputs, and are not meant to be limiting. Methods for producing coordinated outputs may omit and/or add steps to the method(s) 200, 300. Similarly, steps of the methods 200, 300 may be performed in different orders than the example orders discussed above.

Figure 4:
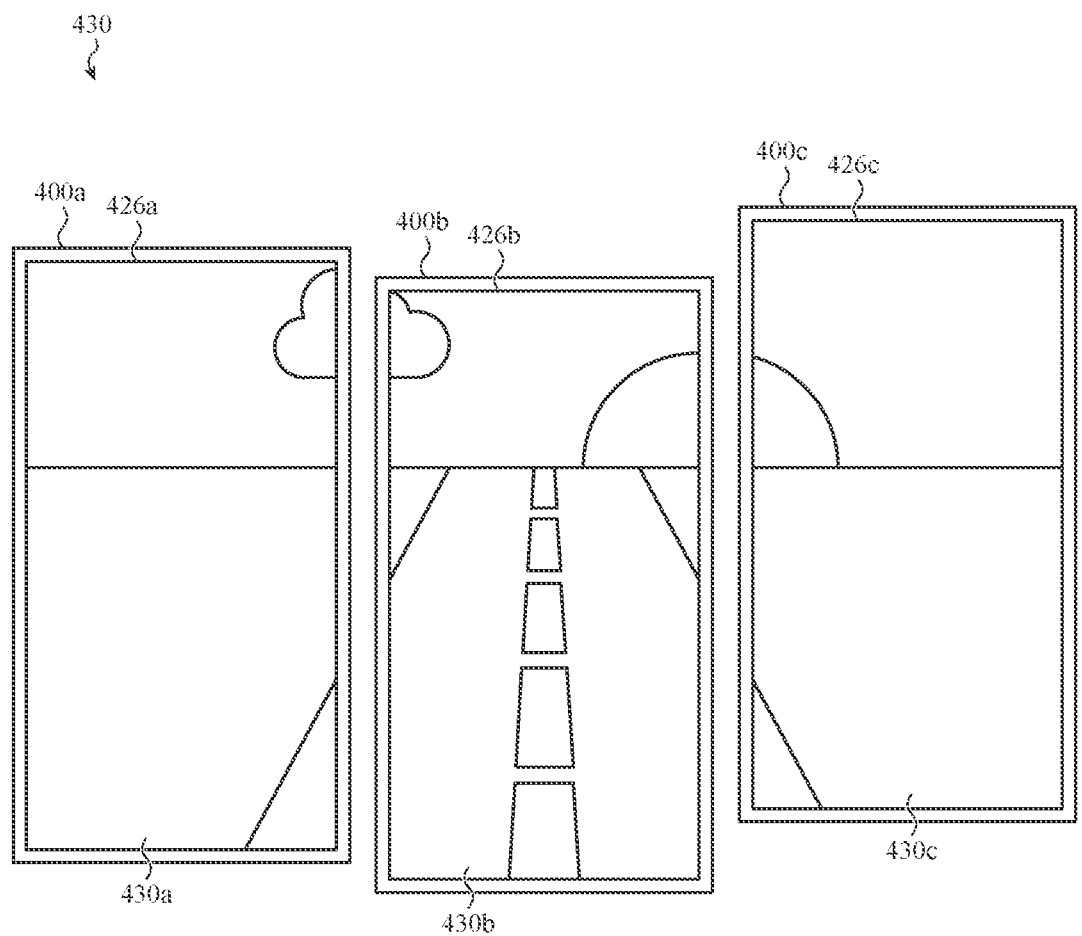
FIG. 4 shows an example coordinated graphical output presented using displays of example electronic devices.

As one example of a coordinated output, multiple devices may present a coordinated graphical output using displays of the devices. FIG. 4 shows an example coordinated graphical output 430 presented using displays 426a, 426b, 426c of example electronic devices 400a, 400b, 400c.

The example electronic devices 400a-c may be similar to the electronic devices described herein, including electronic devices 100 and 100a-e, and may include similar structure and/or functionality. Each display 426a, 426b, 426c may provide a respective partial graphical output (e.g., partial graphical outputs 430a, 430b, 430c, respectively) based on a position of the display relative to the other displays. The partial graphical outputs 430a-c combine to produce the coordinated graphical output 430 using all three displays 426a-c. As shown in FIG. 4, the partial graphical outputs 430a-c may not overlap with one another. That is, the partial graphical outputs 430a-c may include different parts of the input media stream.

As shown in FIG. 4, the electronic devices 400a-c may be arranged in a tiled arrangement. For example, the electronic devices 400a-c may be placed near one another on a table, desk, or other surface. As shown in FIG. 4, the electronic device 400b may be positioned between the electronic device 400a and the electronic device 400c. The electronic device 400a may be positioned along a left side of the electronic device 400b, the electronic device 400c may be positioned along a right side of the electronic device 400c. The partial graphical output 430a produced by the electronic device 400a may include a left portion of the input media stream, the partial graphical output 430b produced by the electronic device 400b may include a middle portion of the input media stream, and the partial graphical output 430c produced by the electronic device 400c may include a right portion of the input media stream. As noted above, the graphical outputs 430a-c may not overlap with one another such that each provides a different part of the input media stream.

One of the electronic devices 400a-c may determine the relative positions of the electronic devices and/or the partial graphical outputs 430a-c for each device. The processing unit of the electronic device 400b may determine that the electronic device 400a is positioned along a left side of the electronic device 400b, that the electronic device 400c is positioned along a right side of the electronic device 400b and may determine one or more of the partial graphical outputs 430a-c based on the determination.

As shown in FIG. 4, the electronic devices 400a-c may not be perfectly aligned with one another. Additionally or alternatively, the displays 426a-c may have different sizes and/or aspect ratios from one another. Determining the positions of the electronic devices 400a-c relative to one another may include determining a relative position and/or orientation of the displays of each device 400a-c, and may allow the determined partial graphical outputs 430a, 430b, 430c to be aligned with one another even when the electronic devices 400a-c are not aligned with one another and/or have different sizes and/or aspect ratios from one another. In some cases, orientations of the partial graphical outputs 430a-c are determined at least in part based on the relative orientations of the devices 400a-c.

The coordinated graphical output 430 may extend across multiple displays 426a-c, for example so that the coordinated graphical output may be presented at a larger size than any of the electronic devices 400a-c would be capable of providing on their own. The input media stream for the coordinated graphical output 430 may be an image, a movie, a graphical object, a graphical user interface (e.g., of an application, of an operating system, etc.), a video conference, another graphical output, or some combination thereof.

The electronic devices 400a-c may be portable electronic devices, such as smartphones or tablet computing devices. In various embodiments, the electronic devices 400a-c may take the form of any suitable electronic device or combination of devices. One or more of the displays 426a-c may be touch screen displays configured to receive inputs corresponding to the coordinated graphical output 430.

Figure 5A:
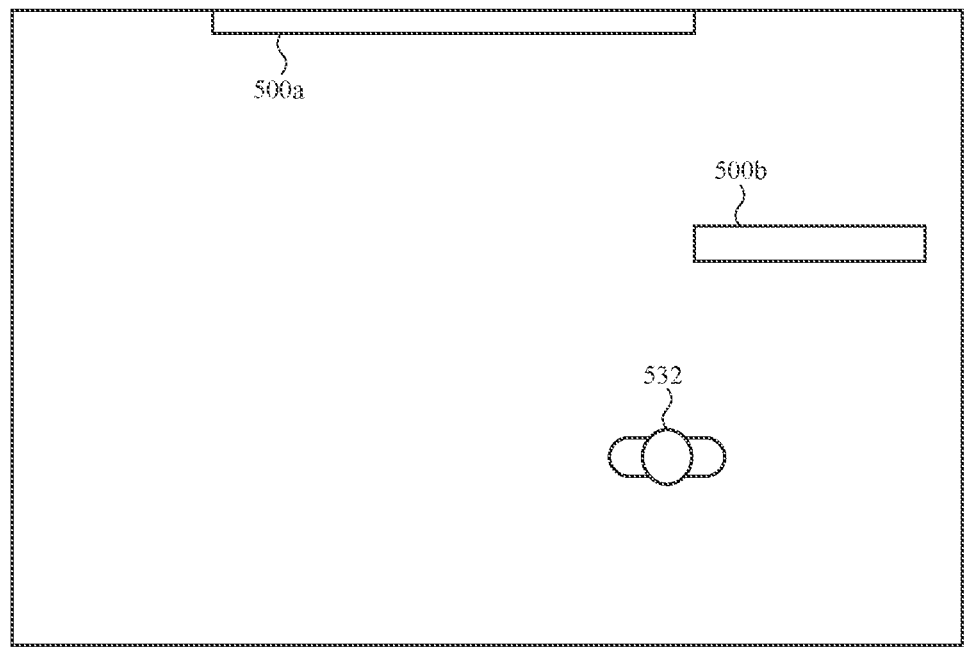
FIGS. 5A and 5B show an example coordinated graphical output provided by electronic devices.
Figure 5B:
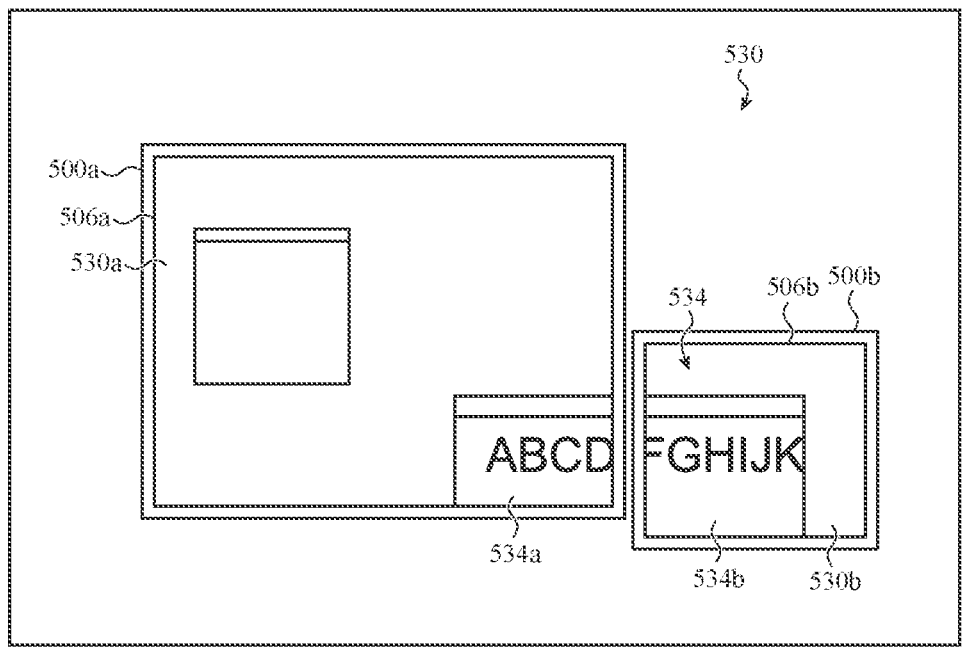

In some cases, the partial outputs provided by the electronic devices may be determined based on the devices' positions relative to a viewing position (e.g., a position from which a user views the electronic devices). FIGS. 5A and 5B show an example coordinated graphical output provided by electronic devices 500a and 500b. FIG. 5A shows an overhead view showing the relative positions and directions of the electronic devices 500a and 500b and a viewing position 532. FIG. 5B shows a view of the electronic devices 500a, 500b from the viewing position 532. The electronic devices 500a, 500b may include displays 506a, 506b respectively that are configured to provide graphical outputs, including partial graphical outputs of a coordinated graphical output. The electronic devices 500a, 500b may be standalone displays, such as monitors, televisions, projectors and screens, or the like, that are operably coupled to one or more other electronic devices or they may be other electronic devices that include integrated displays. In some cases, the electronic devices 500a, 500b are displays that are operably coupled to and driven by a common electronic device.

The partial graphical outputs 530a and 530b may be determined based on the viewing position 532. For example, the partial graphical outputs 530a, 530b may be determined based on a determined position of a device that is positioned at a location that is estimated or predicted to be at or near the viewing position 532.

As shown in FIG. 5A and FIG. 5B, the electronic devices 500a, 500b and/or the displays 506a, 506b thereof may be differently sized and/or be positioned at different positions relative to a viewing position 532. For example, the electronic device 500a may be a larger wall-mounted device, such as a television or projector screen, and the electronic device 500b may be a smaller device such as a computer monitor, laptop, tablet, or the like. As shown in FIG. 5B, the electronic devices 500a, 500b may provide coordinated graphical output 530 that appears consistently sized across both displays 506a, 506b to a user at the viewing position 532.

In some cases, display scales of at least one of the partial graphical outputs 530a and/or 530b (e.g., a display scale of one or both of the displays 506a, 506b) may be adjusted so that the coordinated graphical output 530 appears consistently sized across both displays 506a, 506b to a user at the viewing position 532. As used herein, "display scale" may refer to any setting or display property that determines the size of graphical objects displayed as part of a graphical output, including, but not limited to, zoom level, cropping parameters, overscan, underscan, screen resolution, and the like. For example, the electronic device 500a may display a partial graphical output 530a at a first scale and the electronic device 500b may display a partial graphical output 530b at a second scale different from the first scale. The second scale may be determined based on the first scale and relative positions of the electronic devices 500a, 500b and the viewing position 532. For example, as shown in FIG. 5B, an object 534 (e.g., a graphical object that is part of a graphical user interface) that extends across both displays 506a, 506b may have portions 534a, 534b that appear in the same scale to a user at the viewing position 532.

The viewing position 532 may be determined using device localization techniques as described herein. For example, an electronic device may be positioned at or near the viewing position 532, and its relative position may be determined using the techniques described herein.

Figure 6:
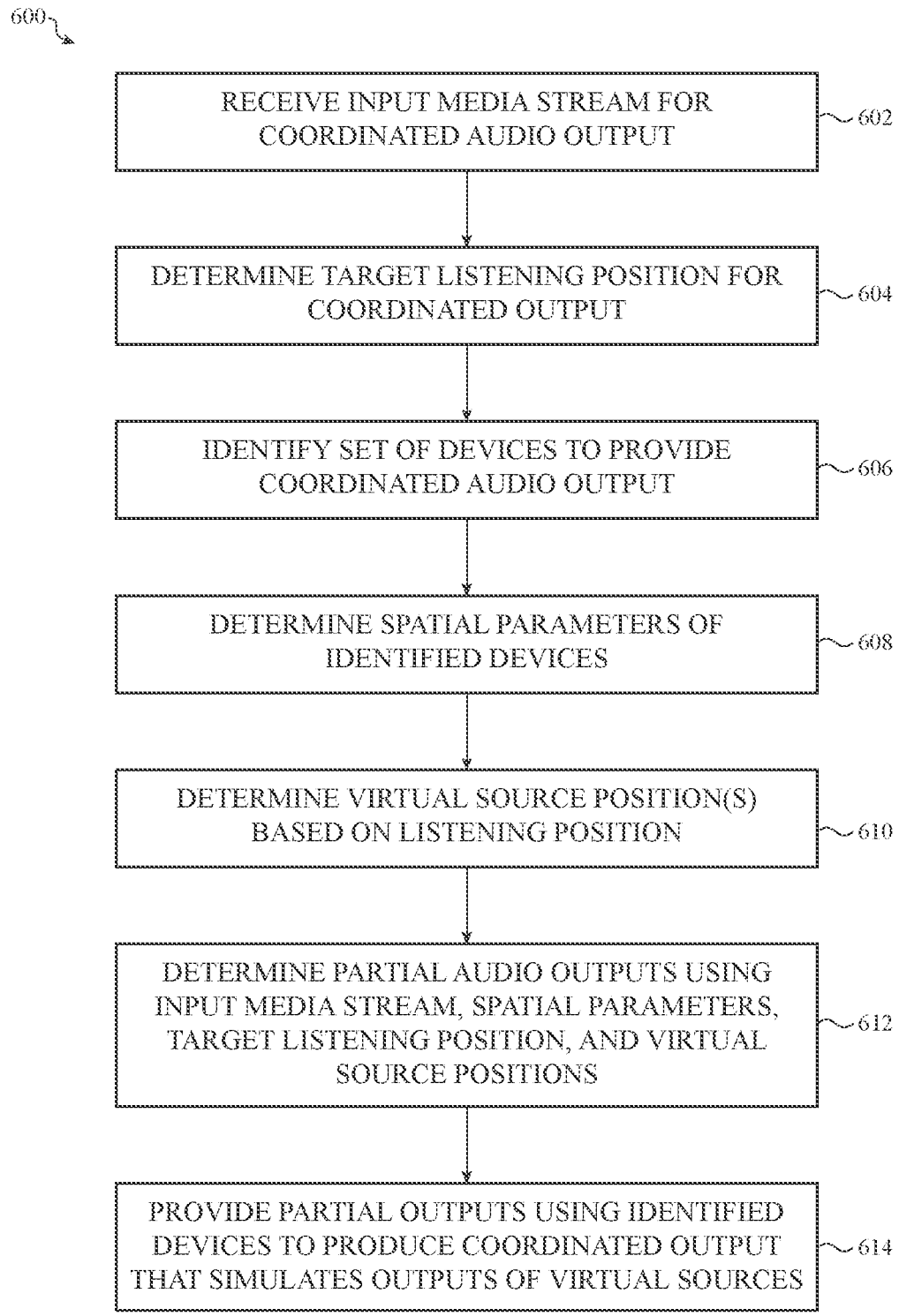
FIG. 6 shows a flowchart of an example method for providing partial audio outputs to produce a coordinated audio output.
Figure 7:
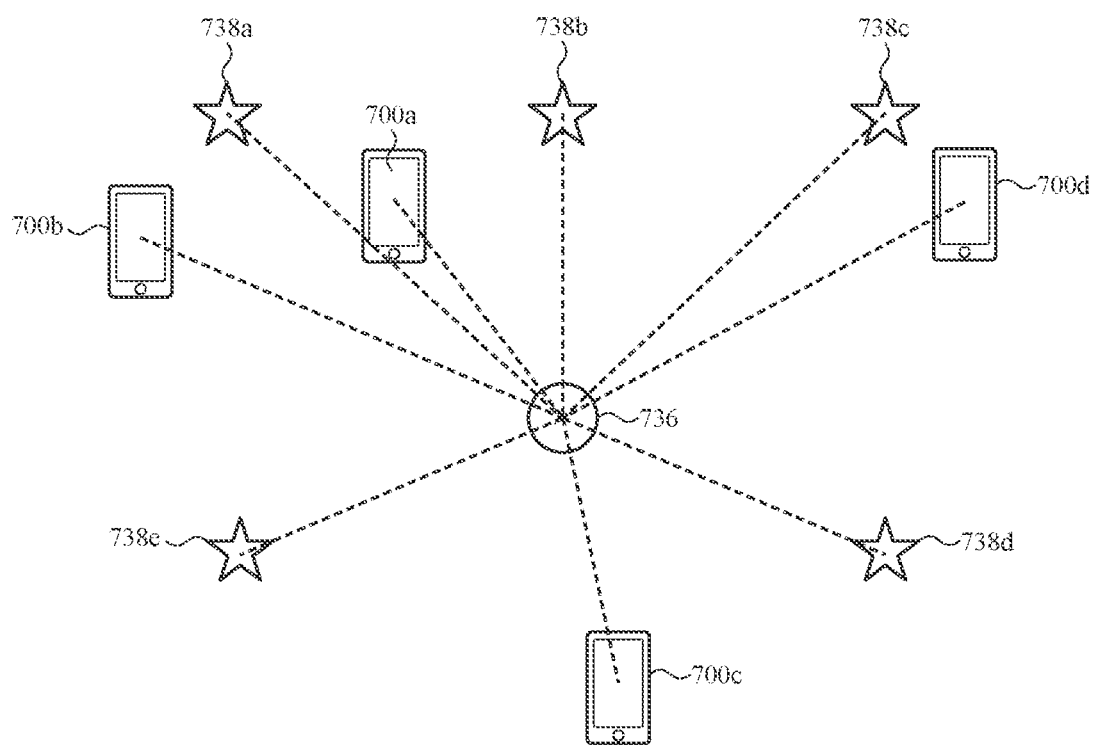
FIG. 7 illustrates an example arrangement of electronic devices for providing partial audio outputs to produce a coordinated audio output.

As another example of coordinated output, multiple devices may present a coordinated audio output using speakers at least partially within and/or operably coupled to the devices. In some cases, the partial outputs provided to produce a coordinated audio output may be modified to simulate one or more virtual sound sources at different positions than the devices providing the partial outputs. For example, the partial outputs provided to produce a coordinated audio output may be modified to simulate a surround sound arrangement (e.g., a 5.1 or 7.1 surround sound arrangement). FIG. 6 shows a flowchart of an example method 600 for providing partial audio outputs to produce a coordinated audio output. FIG. 7 illustrates an example arrangement of electronic devices for providing partial audio outputs to produce a coordinated audio output.

At operation 602, an input media stream for providing a coordinated audio output is received. As noted above, the input media stream may be received by a master device designated to perform group-level processing activities with one or more additional devices. For example, a device 700a may receive the input media stream. In some cases, the input media stream may be determined based on a user selection, such as via a graphical user interface of an electronic device. As noted above, an input media stream for a coordinated audio output may be audio files, audio components of media items, such as movies, other sounds, and the like.

At operation 604, a target listening position for the coordinated audio output is determined. In some cases, the device 700a determines the target listening position. The target listening position may be a position or region for which the coordinated audio output is optimized or enhanced, such as a position of a listener. FIG. 7 shows a target listening position 736 positioned relative to devices 700a-d. In some cases, the target listening position 736 corresponds to a location of an electronic device, and device localization techniques similar to those discussed herein may be used to determine the target listening position. The electronic device that corresponds to the target listening position 736 may provide a partial output or may not provide a partial output. In some cases, the electronic device that corresponds to the target listening position 736 is a master device as discussed herein and performs group-level processing. Additionally or alternatively, a device 700a-d or another device may be a master device.

At operation 606, a set of devices for providing the coordinated audio output is determined as discussed above with respect to operation 204 of FIG. 2. In some cases, the device 700a determines the set of devices. The devices may include dedicated audio devices (e.g., network-connected speakers) or other electronic devices capable of providing audio outputs. For example, as shown in FIG. 7, devices 700a-d may be determined as a set of devices for providing a coordinated output.

At operation 608, a set of spatial parameters for each of the identified devices is determined. In some cases, the device 700a determines one or more of the sets of spatial parameters. As described in more detail above, determining spatial parameters may include performing device localization techniques, such as UWB localization techniques. For example, the set of spatial parameters may be determined using one or more wireless signal pulses. The spatial parameters may include relative positions (e.g., distances and directions) of the devices 700a-d and/or the target listening position 736. Additionally or alternatively, the spatial parameters may include orientations of the devices 700a-d relative to one another and/or the target listening position 736. In various embodiments, each device 700a-d may determine one or more spatial parameters regarding itself or another device. The determined spatial parameters may be communicated to one or more other electronic devices, such as the master device.

At operation 610, a set of virtual source positions is determined based on the input media stream and the target listening position. In some cases, the device 700a determines one or more of the virtual source positions. For example, as shown in FIG. 7, virtual source positions 738a-e may be determined based on the input media stream and the target listening position 736. As noted above, a coordinated audio output may simulate virtual outputs of one or more virtual sound sources at the virtual source positions 738a-e, which may be different positions than the devices 700a-d providing the partial outputs.

The virtual outputs for the virtual source positions 738a-e may be produced by a combination of multiple partial outputs from multiple electronic devices 700a-d. Additionally or alternatively, a partial output provided by a single electronic device 700a-d may be used to provide at least portions of virtual outputs for multiple virtual source positions 738a-e. In some cases, the virtual source positions may be the same as the positions of the electronic devices 700a-d, and/or each electronic device 700a-d may produce a virtual output for the virtual source position at which it is placed.

The set of virtual source positions may be arranged to simulate a surround sound speaker arrangement, a stereo speaker arrangement, a single speaker, or the like. As one example, the input media stream may include a multi-channel audio stream, such as a 5-channel audio signal, and the coordinated audio output may simulate virtual outputs for each channel positioned in a particular arrangement that optimizes or enhances the listening experience. Each virtual source position 738a-e may be associated with a channel of the multi-channel audio stream. For example, the virtual source position 738a may correspond to a front left channel, the virtual source position 738b may correspond to a center channel, the virtual source position 738c may correspond to a front right channel, the virtual source position 738d may correspond to a rear right channel, and the virtual source position 738e may correspond to a rear left channel. The coordinated audio output may simulate virtual outputs from each of the five channels. In some cases, the coordinated audio output may be part of a stream that includes audio and video, such as a movie or other media item.

FIG. 7 shows five virtual source positions, but this is illustrative and not intended to be limiting. In various embodiments, coordinated outputs may be provided using more or fewer virtual source positions. As one example, multiple electronic devices may simulate a single virtual source position (e.g., a single speaker). As another example, if the input media stream includes a stereo audio signal, two virtual source positions may be identified to use the electronic devices to simulate stereo speakers.

At operation 612, a set of partial audio outputs is determined based on the input media stream, the determined spatial parameters, the target listening position, and the virtual source positions. In some cases, the device 700a determines the set of partial outputs. For example, each device 700a-d of FIG. 7 may provide a partial audio output to simulate at least a portion of one or more virtual outputs at the virtual source positions 738a-e based on the spatial parameters of the devices 700a-d and the target listening position 736. As noted above, the virtual outputs for the virtual source positions 738a-e may be produced by a combination of multiple partial outputs from multiple electronic devices 700a-d. Additionally or alternatively, a partial output provided by a single electronic device 700a-d may be used to provide at least portions of virtual outputs for multiple virtual source positions 738a-e.

Determining the partial audio outputs may include determining which device(s) 700a-d will provide some or all of the virtual output for each virtual source position 738a-e. A device 700a-d whose partial output produces some or all of a virtual output at a virtual source position 738a-e may be chosen based on its proximity to the virtual source position and/or the target listening position, either absolute or relative to the other device(s) 700a-d.

In some cases, the closest one or more devices 700a-d to a virtual source position 738a-e may be used to simulate at least part of the virtual output of the virtual source position. For example, the electronic device 700d may be used to simulate some or all of the virtual output at the virtual source position 738c because it is the closest device to the virtual source position 738c. As further examples, the electronic devices 700a and 700b may be used to simulate the virtual output of the virtual source position 738a, and the electronic device 700c may be used to simulate some or all of the virtual output at the virtual source position 738d. In some cases, all devices 700a-d within a threshold distance from a virtual source position 738a-e may be used to simulate the virtual output of the virtual source position.

Additionally or alternatively, a device 700a-d whose partial output produces some or all of a virtual output at a virtual source position 738a-e may be chosen based on output capabilities of the devices, including a speaker type, an audio output frequency range, or the like. For example, a virtual output that includes low-frequency components may be produced, at least in part, by a device 700a-d that has a subwoofer or speaker capable of providing the low-frequency components. Similarly, a virtual output that includes high-frequency components may be produced, at least in part, by a device 700a-d that has a tweeter or speaker capable of providing the high-frequency components.

Determining the partial audio output for a device 700a-d may include determining which portion(s) of the input media stream to provide to simulate the virtual output(s) identified for the device. Determining the partial audio output for a device 700a-d may include determining which portion(s) of the input media stream correspond to each channel of a multi-channel audio stream. For example, determining the partial audio output for the device 700d may include determining a front right channel for the input media stream. In some cases, the portions (e.g., channels) of the input media stream corresponding to each virtual source position are provided in the input media stream. For example, the input media stream may include multiple files, streams, or other data sources, each corresponding to a channel or other portion of the input media stream. In some cases, the portions of the input media stream are determined by processing the input media stream to separate one or more files of the input media stream into the portions, for example using one or more devices 700a-d and/or a master device.

Determining the partial audio output for a device 700a-d that is simulating a virtual output may include determining modifications to the determined portion(s) of the input media stream based on one or more other devices 700a-d that are cooperating with the device to produce the same virtual output. For example, determining the partial audio output for the electronic device 700a may include determining which portion of the virtual output for the virtual source position 738a-e will be produced by the electronic device 700a and which portion of the virtual output for the virtual source position will be produced by the electronic device 700b.

Determining the partial audio output for a device 700a-d may include determining a volume (e.g., loudness) of the partial audio output based on the position of the device with respect to one or more additional devices 700a-d, one or more virtual source positions 738a-e, and/or the target listening position 736. For example, a volume of a partial audio output of a device that is closer to the target listening position 736 may be lower than a volume of a partial audio output of a device that is farther from the target listening position. As another example, a volume of a partial audio output that produces part of a virtual output in conjunction with another device may be lower than a volume of a partial audio output that produces part of a virtual output by itself.

Determining the partial audio output for a device 700a-d may include determining modifications to the determined portion(s) of the input media stream based on its position relative to the virtual source position(s) 738a-e for which it is simulating some or all of the virtual output(s). For example, determining the partial audio output for the electronic device 700d may include determining modifications to the portion of the input media stream that makes up the partial output produced by the electronic device 700d so that a user at the target listening position 736 perceives the virtual output corresponding to the virtual source position 738c as originating from the virtual source position 738c. Modifying the portion of the input media stream may include adjusting a volume and/or amplitude, shifting the amplitude or volume of a respective channel of a multi-channel stream, adjusting frequencies or tones of the output, and the like.

At operation 614, partial audio outputs are provided at each identified device to produce the coordinated output. Each determined device may produce its partial audio output such that, when combined with the partial audio outputs produced by the other devices, produces the coordinated output. In some cases, as discussed in more detail above with respect to FIG. 3, the partial outputs provided to produce a coordinated output may be dynamically updated (e.g., in real time or in near real time) as the spatial parameters of the electronic devices providing the coordinated output change. The updated spatial parameters may be detected at regular intervals. The intervals may be less than one minute, less than ten seconds, less than 5 seconds, less than one second, less than 500 milliseconds, less than 100 milliseconds, or shorter.

The method 600 is an example method for producing coordinated audio outputs, and is not meant to be limiting. Methods for producing coordinated audio outputs may omit and/or add steps to the method 600. Similarly, steps of the method 600 may be performed in different orders than the example order discussed above.

Figure 8:
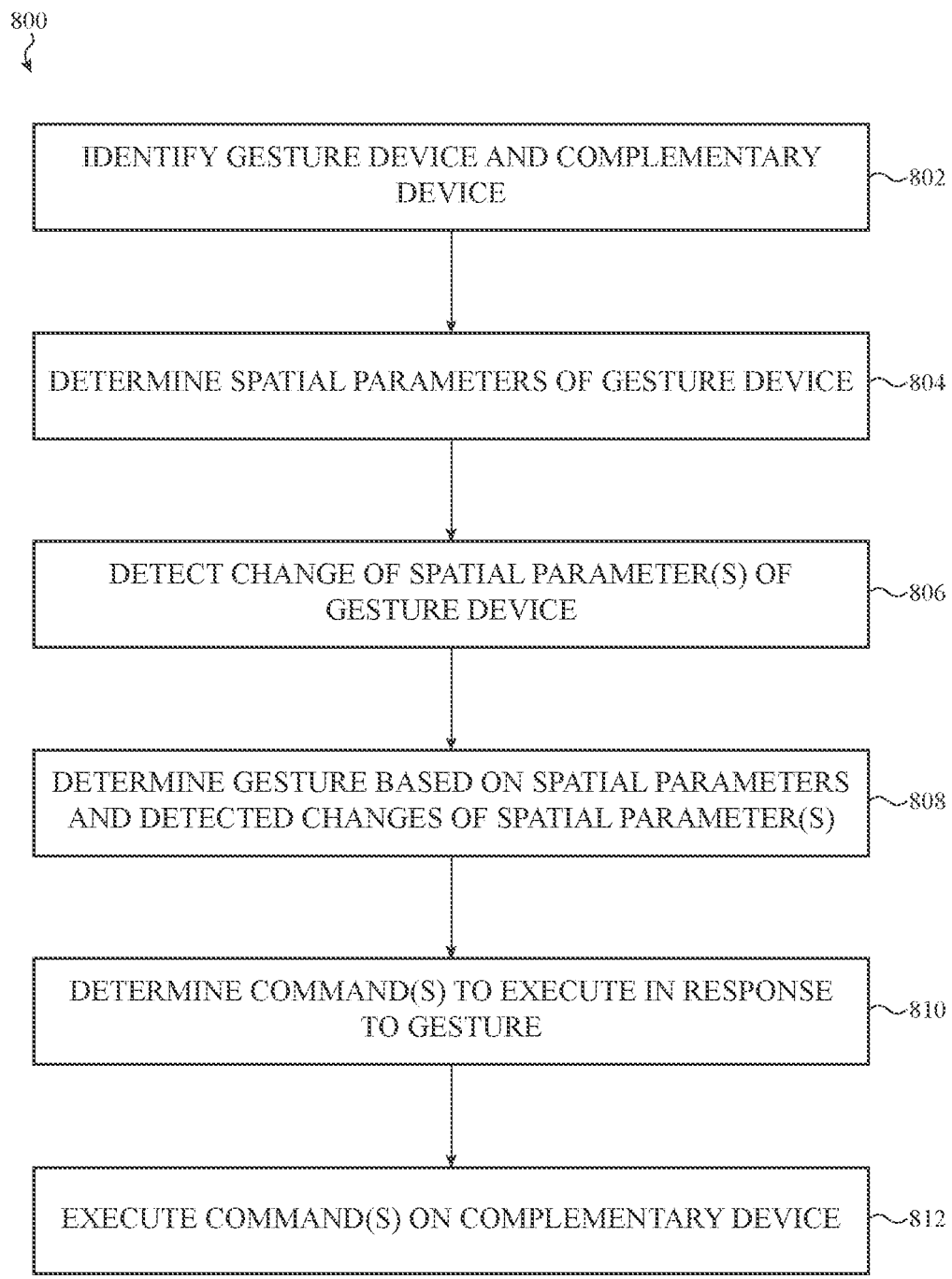
FIG. 8 shows a flowchart of an example method for controlling one or more complementary devices using gestures corresponding to changes of spatial parameters.
Figure 9A:
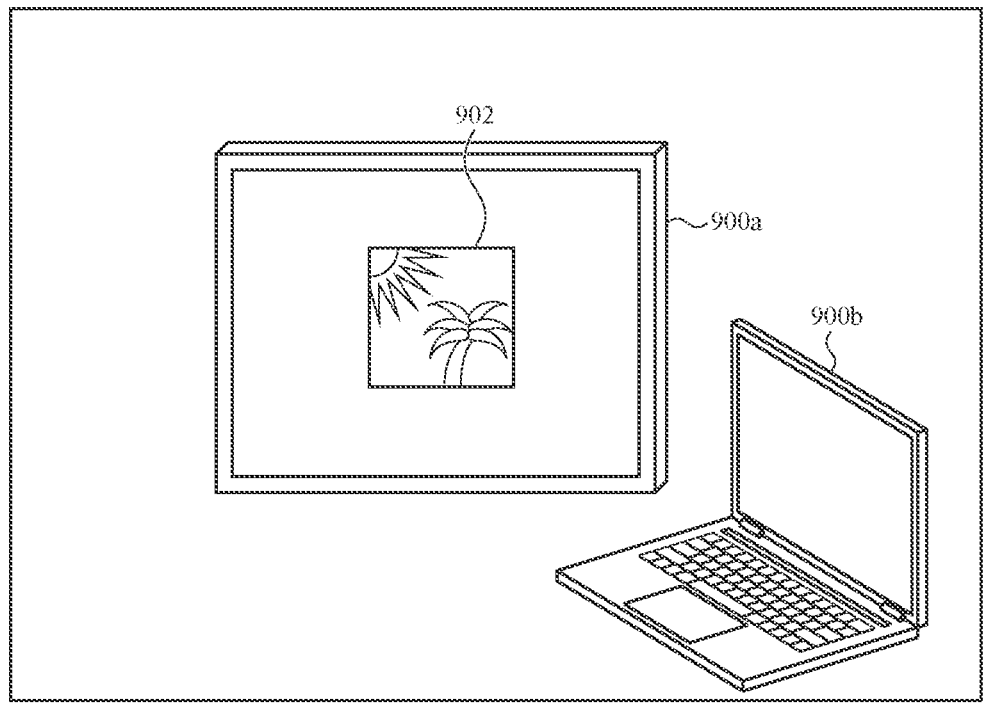
FIGS. 9A-9D illustrate example complementary devices and that may be controlled by gestures detected using a gesture device.
Figure 9B:
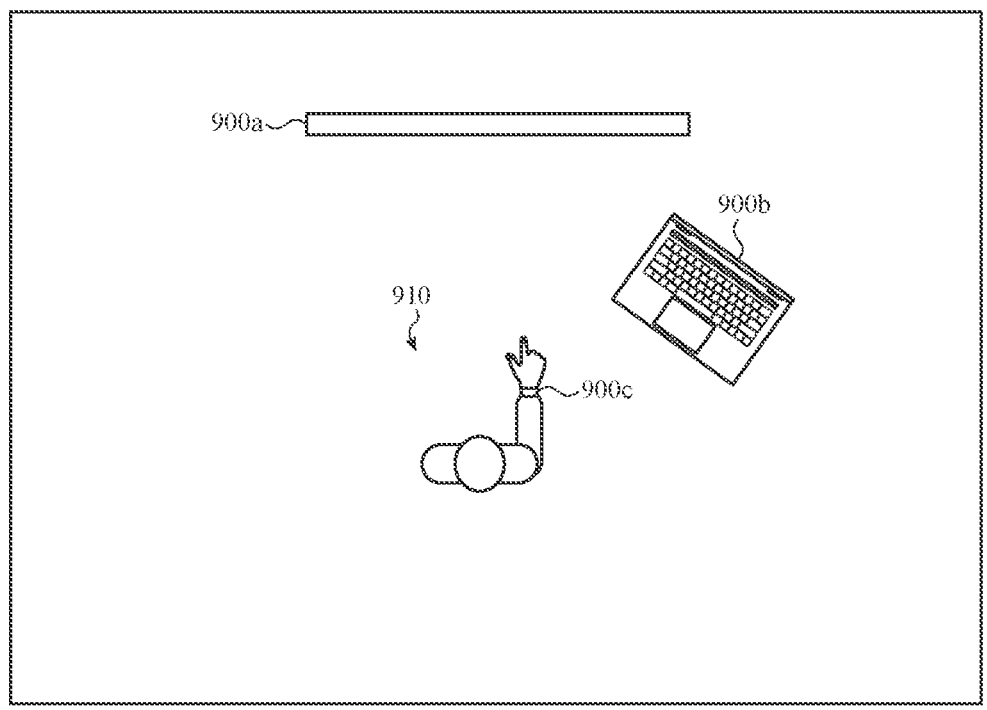
Figure 9C:
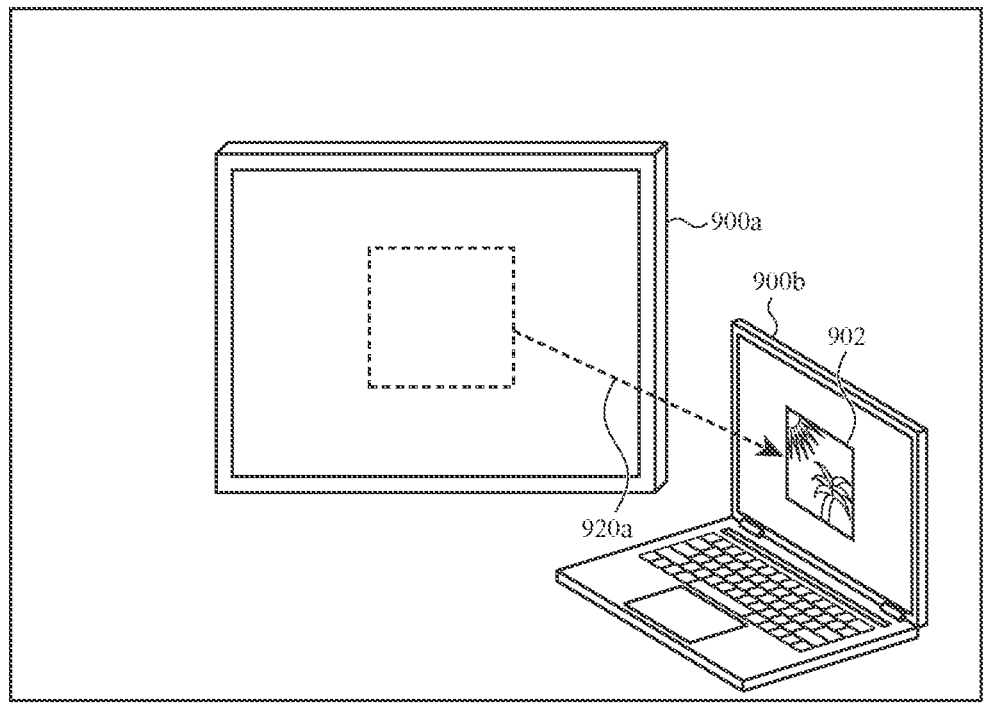
Figure 9D:
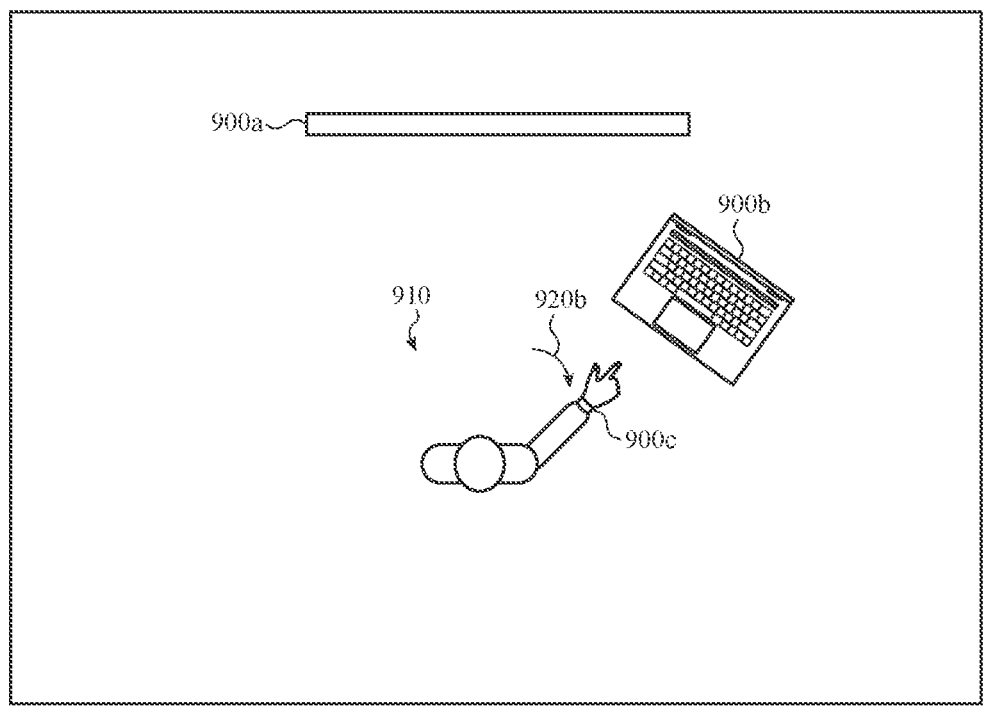

As noted above, changes of spatial parameters may be detected as gestures for controlling one or more electronic devices. FIG. 8 shows a flowchart of an example method 800 for controlling one or more complementary devices using gestures corresponding to changes of spatial parameters. FIGS. 9A-9D illustrate example complementary devices 900a and 900b that may be controlled by gestures detected using a gesture device 900c. FIGS. 9A and 9C show the complementary devices 900a and 900b from a viewing position of a user 910. FIGS. 9B and 9D show an overhead view of the user 910, the complementary devices 900a and 900b, and the gesture device 900c. Gestures may be used to perform changes to a user interface, such as moving graphical objects on a screen and/or between multiple screens. Gestures may mimic touch-screen inputs, such as taps, drags, and the like. Gestures may also be used for device authentication and unlocking and any other suitable commands to control an electronic device.

At operation 802, one or more complementary devices and one or more gesture devices are identified. Complementary devices may include any suitable electronic device for receiving inputs and/or providing outputs, such as those described herein, including, but not limited to, devices for providing graphical outputs, audio outputs, visual outputs, haptic outputs, and combinations thereof. For example the complementary devices 900a and 900b of FIGS. 9A-9D may be configured to provide graphical outputs, including partial outputs to provide a coordinated output.

Gesture devices may include electronic devices such as wearable electronic devices (e.g., electronic watches) or handheld devices (e.g., smartphones) that move in association with gestures (e.g., moving a hand, arm, or other body part) by a user. For example, as shown in FIG. 9B, the gesture device 900c may be an electronic watch on an arm or wrist of a user 910. Movement (e.g., changes of spatial parameters) of the gesture device 900c, for example caused by the user 910 moving the device, may be used to detect gesture(s) for controlling the outputs of the complementary device(s) 900a and/or 900b. In some cases, the gesture device and the complementary device are the same device, and gestures detected using the gesture device are used to control the gesture device.

At operation 804, spatial parameters of the gesture device (s) and/or the complementary device(s) are determined. As described in more detail above, determining spatial parameters may include performing device localization techniques, such as UWB localization techniques. At operation 806, changes of spatial parameters may be detected, for example as described with respect to FIG. 3.

At operation 808, gestures may be determined based on the spatial parameters and/or the changes of the spatial parameters. The spatial parameters (e.g., the position or orientation of the gesture device) may indicate a direction that the user is pointing or another gesture. For example, as shown in FIG. 9B, the user 910 may be pointing at the device 900a. The spatial parameters determined as part of operation 804 may indicate that the user 910 is pointing at the device 900a. Detecting a gesture may include detecting a pointing direction or another static gesture. The orientation of the electronic device 900c may be associated with the direction a user is pointing and/or a direction of a gesture, automatically or manually by a user.

As shown in FIG. 9D, the user 910 may move his or her arm in the direction of the arrow 920b to point at the device 900b, which may result in a change in the determined spatial parameters of the gesture device. Changes of spatial parameters may be detected by determining spatial parameters at the beginning of a movement, at the end of a movement, and/or during a movement and determining differences therebetween. The determined spatial parameters may be used to determine vector(s) from the user's hand or other reference point to the complementary devices. As the spatial parameters of the gesture device change, updated vectors may be determined, and differences between the vectors and the updated vectors may be used to determine the gesture.

At operation 810, one or more commands are determined for execution in response to the gesture. Commands may include initiating, changing, or ceasing a coordinated output or other output, performing authentication, receiving inputs, executing applications, performing operations, user interface changes, and the like. At operation 812, the determined commands are executed on one or more complementary devices. As shown in FIGS. 9A-9B, the user 910 may initially be pointing at a graphical object 902 provided as part of a partial output by complementary device 900a. As the user performs the gesture of pointing at the complementary device 900b, the graphical object 902 may move from the display of the complementary device 900a to the display of the complementary device 900b along a path shown by the arrow 920a. Moving the graphical object 902 may include changing the partial outputs provided by the complementary devices 900a and 900b.

The method 800 is an example method for controlling one or more complementary devices using gestures corresponding to changes of spatial parameters, and is not meant to be limiting. Methods for producing coordinated audio outputs may omit and/or add steps to the method 800. Similarly, steps of the method 800 may be performed in different orders than the example order discussed above.

Figure 10:
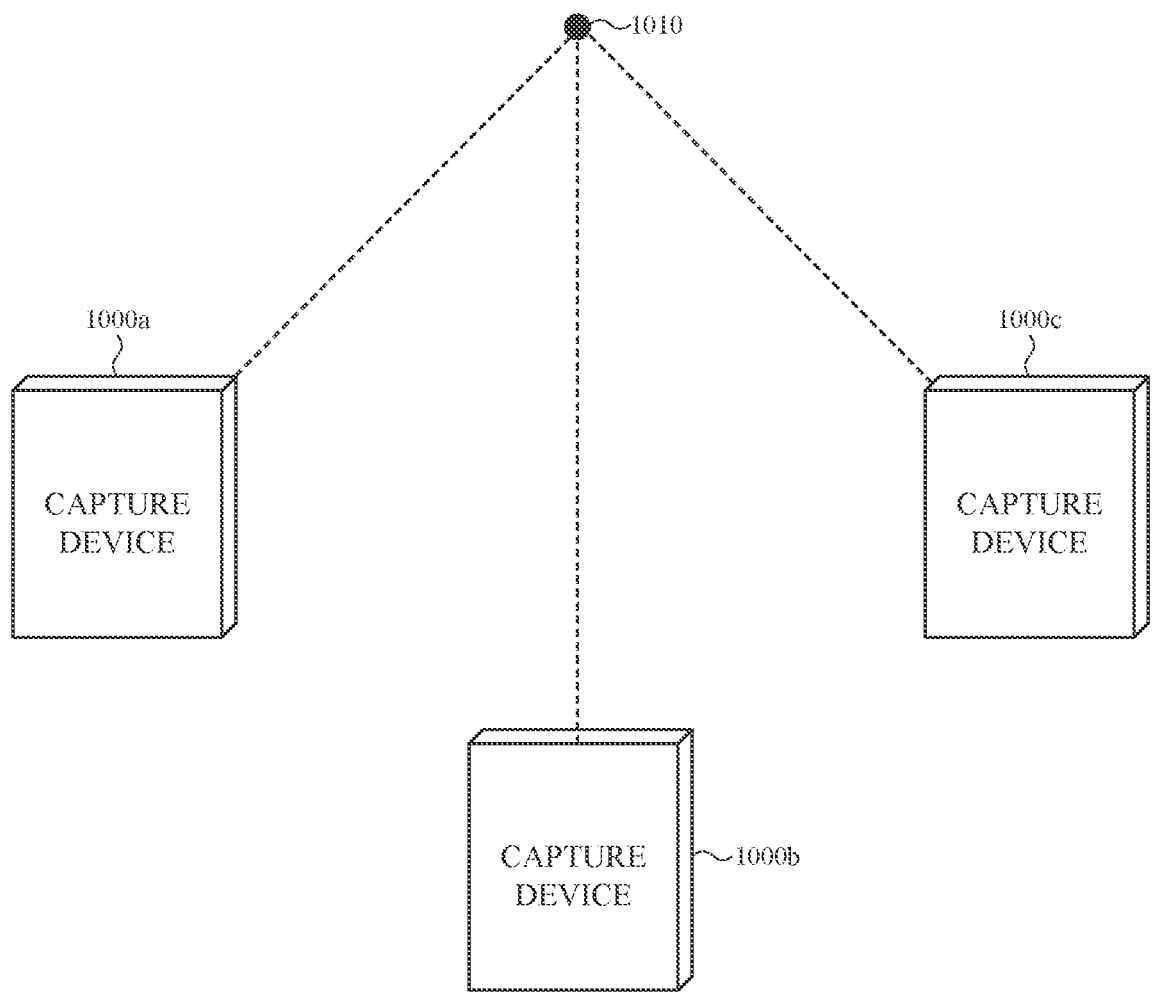
FIG. 10 shows example capture devices configured to capture data from a source.

As noted above, device localization techniques may be used to combine inputs from multiple devices. FIG. 10 shows example capture devices 1000a-c configured to capture data from a source 1010. Two or more capture devices may detect inputs from different positions relative to a source of the input. For example, multiple audio recording devices may receive audio data from different positions relative to an audio source, such as a stage at a concert. As another example, multiple image or video devices may capture images or video of a subject from different positions relative to the subject, such as multiple cameras arranged around an object such as a house. Similarly, one or more image or video devices may capture images or video of a subject from different positions at different times.

Each capture device 1000a-c may capture a partial input that consists of data captured by the capture device. Spatial parameters for the capture devices 1000a-c may be determined using the techniques described herein to create a coordinated input using the partial inputs. For example, multiple images or videos captured by one or more capture devices 1000a-c may be combined to produce a 3-dimensional model or stitched image. As another example, multiple synchronous audio inputs may be combined based on the relative positions and/or orientations of the devices capturing the audio inputs, for example to create a multi-channel audio item.

At least a portion of the determined spatial parameters may be stored or associated with an associated portion of the recorded stream. As the device moves, the spatial parameters are updated and stored or associated with the respective portion of the recorded stream.

Knowing the spatial parameters (e.g., relative positions) of the capture device(s) when each partial input is captured may drastically reduce the computation necessary to combine the partial inputs. For example, processing related to edge-matching and other combination techniques may be reduced or eliminated, which may increase the speed and/or accuracy of creating the coordinated inputs. In some cases, there may be a source device positioned at or near the source 1010 of the captured data (e.g., the audio source or the subject) and the capture devices 1000a-c may determine their relative positions with respect to the source 1010.

Knowing the spatial parameters of the source position may further improve the efficiency of combination processes.

As one example, multiple recorded streams may be used to simulate virtual recorder (microphone) locations. The recorded streams may be analyzed based on the locations of the virtual recorder locations to compute an accurate audio track (e.g., left and right channel stereo audio track).

Figure 11:
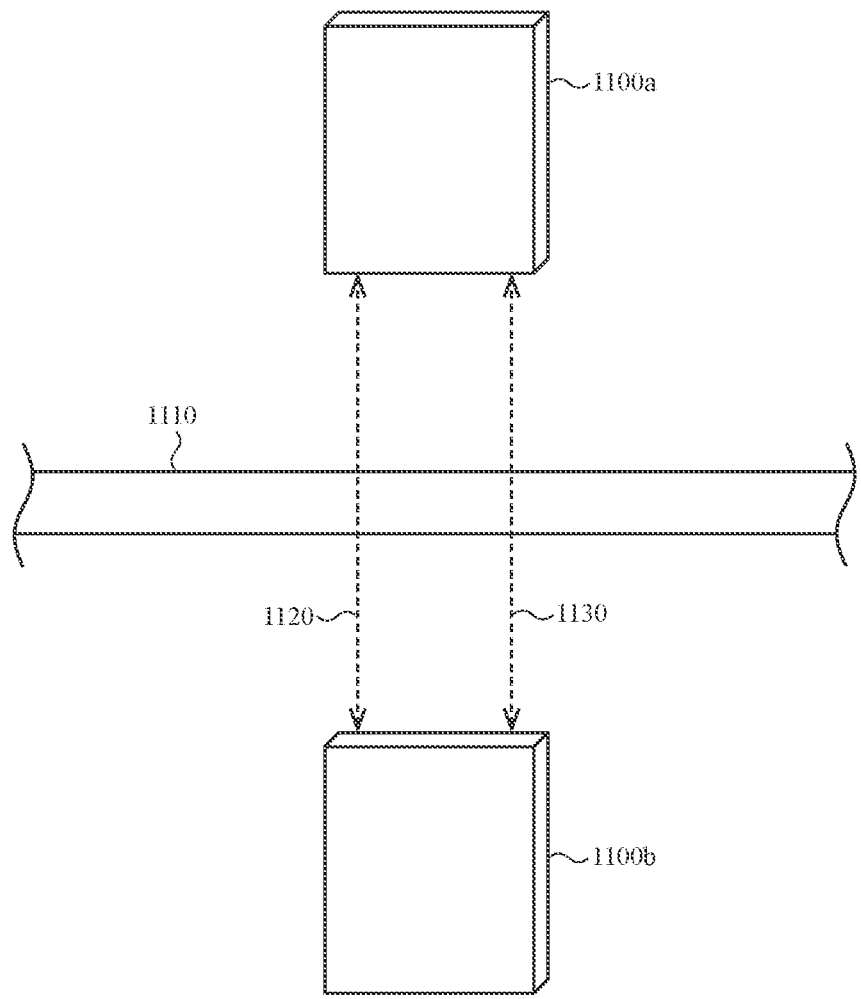
FIG. 11 shows example electronic devices that may be used to determine characteristics of an object.

As noted above, device localization techniques may be combined with other signals to determine a map or 3-dimensional model of one or more spaces or objects, such as a room or building map or model. FIG. 11 shows example electronic devices 1100a and 1100b that may be used to determine characteristics of an object (e.g., a wall 1110). The electronic devices 1100a and 1100b may be similar to other electronic devices discussed herein, and may have similar structure and/or features. The electronic devices 1100a and 1100b may be configured to exchange UWB signals to perform device localization techniques to determine their spatial parameters relative to one another, such as a distance between them and their relative position. The electronic devices 1100a and 1100b may also be configured to exchange complementary signals that behave differently than UWB signals when moving through or around objects. For example, the complementary signals may be audio signals, light signals, or the like.

As one example, the electronic device 1100a may receive a UWB signal 1120 from the electronic device 1100b, and may use the received UWB signal to determine spatial parameters (e.g., the distance and/or position of the electronic device 1100a relative to the electronic device 1100b). Based on the spatial parameters, the electronic device 1100a may determine expected signal characteristics of a complementary signal 1130 sent from the electronic device 1100b to the electronic device 1100a in the absence of objects between or around either device. The electronic device 1100a may receive a complementary signal 1130 sent from the electronic device 1100b to the electronic device 1100a and may compare the signal characteristics of the received complementary signal 1130 to the expected signal characteristics to determine the presence of objects, their positions, shapes, and other characteristics.

Figure 12:
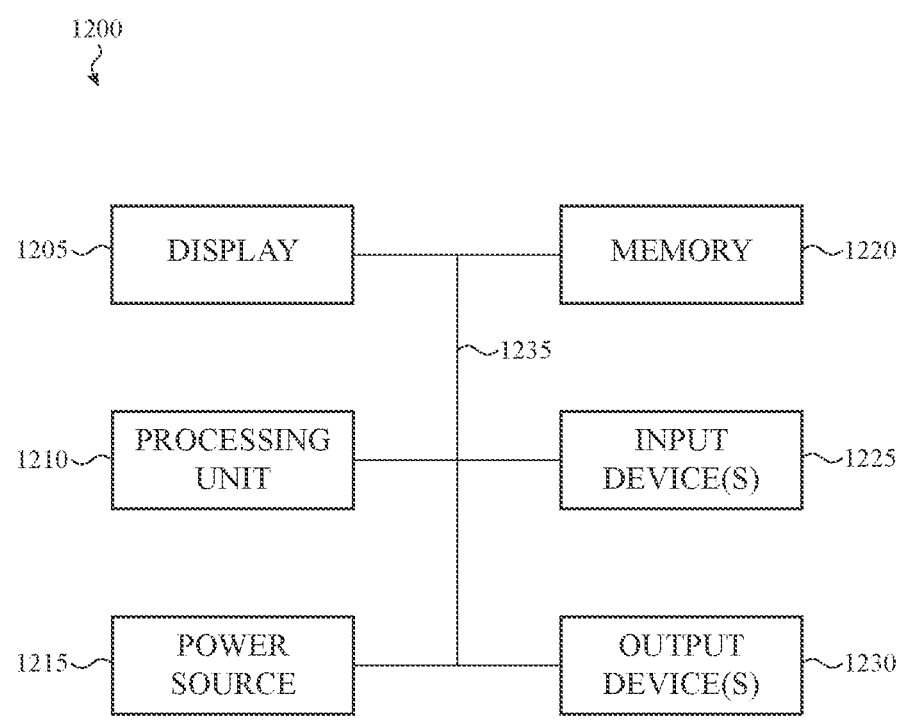
FIG. 12 shows a sample electrical block diagram of an electronic device that may be used to perform device localization techniques to provide coordinated outputs, determine coordinated inputs, and detect gestures, such as those discussed herein.

FIG. 12 shows a sample electrical block diagram of an electronic device 1200 that may be used to perform device localization techniques to provide coordinated outputs, determine coordinated inputs, and detect gestures, such as those discussed herein. The electronic device may in some cases take the form of any suitable electronic device, including smart home control devices, wearable electronic devices, timekeeping devices, health monitoring or fitness devices, portable computing devices, mobile phones (including smartphones), tablet computing devices, digital media players, virtual reality devices, audio devices (including speakers, earbuds, and headphones), and the like. The electronic device 1200 can include a display 1205 (e.g., a light-emitting display), a processing unit 1210, a power source 1215, a memory 1220 or storage device, an input device 1225, and an output device 1230.

The processing unit 1210 can control some or all of the operations of the electronic device 1200. The processing unit 1210 can communicate, either directly or indirectly, with some or all of the components of the electronic device 1200. For example, a system bus or other communication mechanism 1235 can provide communication between the processing unit 1210, the power source 1215, the memory 1220, the input device(s) 1225, and the output device(s) 1230.

The processing unit 1210 can be implemented as any electronic device capable of processing, receiving, or transmitting data or instructions. For example, the processing unit 1210 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1200 can be controlled by multiple processing units. For example, select components of the electronic device (e.g., input devices 1225) may be controlled by a first processing unit and other components of the electronic device 1200 (e.g., the display 1205) may be controlled by a second processing unit, where the first and second processing units may or may not be in communication with each other. In some cases, the processing unit 1210 may determine a biological parameter of a user of the electronic device, such as an ECG for the user.

The power source 1215 can be implemented with any device capable of providing energy to the electronic device 1200. For example, the power source 1215 may be one or more batteries or rechargeable batteries. Additionally or alternatively, the power source 1215 can be a power connector or power cord that connects the electronic device 1200 to another power source, such as a wall outlet.

The memory 1220 can store electronic data that can be used by the electronic device 1200. For example, the memory 1220 can store electrical data or content such as, for example, audio and video files, documents and applications, device settings and user preferences, timing signals, control signals, and data structures or databases. The memory 1220 can be configured as any type of memory. By way of example only, the memory 1220 can be implemented as random access memory, read-only memory, Flash memory, removable memory, other types of storage elements, or combinations of such devices.

In various embodiments, the display 1205 provides a graphical output, for example associated with an operating system, user interface, and/or applications of the electronic device 1200. In one embodiment, the display 1205 includes one or more sensors and is configured as a touch-sensitive (e.g., single-touch, multi-touch) and/or force-sensitive display to receive inputs from a user. For example, the display 1205 may be integrated with a touch sensor (e.g., a capacitive touch sensor) and/or a force sensor to provide a touch- and/or force-sensitive display. The display 1205 is operably coupled to the processing unit 1210 of the electronic device 1200.

The display 1205 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1205 is positioned beneath and viewable through a cover sheet that forms at least a portion of an enclosure of the electronic device 1200.

In various embodiments, the input devices 1225 may include any suitable components for detecting inputs. Examples of input devices 1225 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, humidity sensors, thermometers, anemometers, wind direction sensors, odor sensors, or some combination thereof. Each input device 1225 may be configured to detect one or more particular types of input and provide a signal (e.g., an input signal) corresponding to the detected input. The signal may be provided, for example, to the processing unit 1210.

As discussed above, in some cases, the input device(s) 1225 include a touch sensor (e.g., a capacitive touch sensor) integrated with the display 1205 to provide a touch-sensitive display. Similarly, in some cases, the input device(s) 1225 include a force sensor (e.g., a capacitive force sensor) integrated with the display 1205 to provide a force-sensitive display.

The output devices 1230 may include any suitable components for providing outputs. Examples of output devices 1230 include audio output devices (e.g., speakers), visual output devices (e.g., lights, displays, adjustable window coverings), HVAC devices (e.g., fans, humidifiers, air cooling devices, air heating devices), tactile, haptic, or vibration output devices (e.g., furniture or electronic devices configured to provide haptic output), odor output devices, communication devices (e.g., wired or wireless communication devices), and so on, or some combination thereof. Each output device 1230 may be configured to receive one or more signals (e.g., an output signal provided by the processing unit 1210) and provide an output corresponding to the signal.

In some cases, input devices 1225 and output devices 1230 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1210 may be operably coupled to the input devices 1225 and the output devices 1230. The processing unit 1210 may be adapted to exchange signals with the input devices 1225 and the output devices 1230. For example, the processing unit 1210 may receive an input signal from an input device 1225 that corresponds to an input detected by the input device 1225. The processing unit 1210 may interpret the received input signal to determine whether to provide and/or change one or more outputs in response to the input signal. The processing unit 1210 may then send an output signal to one or more of the output devices 1230, to provide and/or change outputs as appropriate.

As described above, one aspect of the present technology is determining spatial parameters for providing coordinated outputs, determining coordinated inputs, authenticating devices, and the like. The present disclosure contemplates that in some instances this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
an enclosure;
a display positioned at least partially within the enclosure;
a first antenna configured to detect a ultra-wide band (UWB) signal pulse transmitted from a first transmitter of an additional electronic device;
a second antenna configured to detect the UWB signal pulse transmitted from the first transmitter of the additional electronic device;
a third antenna configured to detect the UWB signal pulse transmitted from the first transmitter of the additional electronic device; and
a processing unit configured to:
receive an input media stream;
determine a first distance between the first antenna and the first transmitter of the additional electronic device using the UWB signal pulse detected by the first antenna;
determine a second distance between the second antenna and the first transmitter of the additional electronic device using the UWB signal pulse detected by the second antenna;
determine a third distance between the third antenna and the first transmitter of the additional electronic device using the UWB signal pulse detected by the third antenna;
determine a direction vector from the electronic device to the additional electronic device based on the first distance, the second distance and the third distance, the direction vector defining an orientation of the electronic device to the additional electronic device;
determine a partial graphical output at least partially based on the input media stream and the direction vector from the electronic device to the additional electronic device; and
cause the partial graphical output to be displayed on the display as part of a coordinated graphical output presented using the electronic device and the additional electronic device.

2. The electronic device of claim 1, wherein:
the display is a first display, the partial graphical output is a first partial graphical output, and the processing unit is a first processing unit;
the additional electronic device comprises a second display and a second processing unit;
the second processing unit is configured to:
determine a second partial graphical output based on the input media stream; and
cause the second partial graphical output to be displayed on the second display;
the second partial graphical output does not overlap with the first partial graphical output; and
the first processing unit is configured to determine the first partial graphical output at least partially based on the second partial graphical output.

3. The electronic device of claim 1, wherein:
the display is a first display;
the orientation of the electronic device relative to the additional electronic device comprises a display orientation of the first display of the electronic device relative to a second display of the additional electronic device; and
the processing unit is further configured to:
determine an orientation of the partial graphical output at least in part based on the orientation of the first display relative to the second display; and
display the partial graphical output in accordance with the determined orientation of the partial graphical output.

4. The electronic device of claim 3, wherein:
the orientation of the electronic device relative to the additional electronic device comprises positions of the first and second displays relative to a viewing position; and
the processing unit is configured to determine a display scale of the partial graphical output based on the positions of the first and second displays relative to the viewing position such that, from the viewing position, the coordinated graphical output appears consistently sized across the first and second displays.

5. The electronic device of claim 1, wherein:
the display is a first display and the partial graphical output is a first partial graphical output;
the additional electronic device comprises a second display; and
the processing unit is further configured to determine a second partial graphical output for display on the second display based on the input media stream.

6. The electronic device of claim 1, wherein:
the electronic device is a first smartphone and the additional electronic device is a second smartphone;
the processing unit is further configured to:
determine that the second smartphone is positioned along a left side of the first smartphone;
determine that a third smartphone is positioned along a right side of the first smartphone; and
output the partial graphical output in accordance with determining that the second smartphone is positioned along the left side of the first smartphone and the third smartphone is positioned along the right side of the first smartphone; and the partial graphical output comprises a middle portion of the input media stream.

7. A mobile phone comprising:
a display;
a first antenna configured to detect a ultra-wide band (UWB) signal pulse transmitted from a first transmitter of an additional mobile phone;
a second antenna configured to detect the UWB signal pulse transmitted from the first transmitter of the additional mobile phone;
a third antenna configured to detect the UWB signal pulse transmitted from the first transmitter of the additional mobile phone; and
a processing unit configured to:
  receive a visual item;
  determine a first distance between the first antenna and the first transmitter of the additional mobile phone using the UWB signal pulse detected by the first antenna;
  determine a second distance between the second antenna and the first transmitter of the additional mobile phone using the UWB signal pulse detected by the second antenna;
  determine a third distance between the third antenna and the first transmitter of the additional mobile phone using the UWB signal pulse detected by the third antenna;
  determine a direction vector from the mobile phone to the additional mobile phone based on the first distance, the second distance and the third distance, the direction vector defining an orientation of the mobile phone to the additional mobile phone;
  determine first and second partial graphical outputs at least partially based on the visual item and the direction vector from the mobile phone relative to the additional mobile phone; and
  cause the mobile phone to show the first partial graphical output and the additional mobile phone to show the second partial graphical output.

8. The mobile phone of claim 7, wherein:
the display is a first display:
the additional mobile phone comprises a second display;
the processing unit is further configured to:
  determine an orientation of the first and second partial graphical outputs at least in part based on the orientation of the first display relative to the second display; and
  display the first and second partial graphical outputs in accordance with the determined orientation of the first and second partial graphical outputs.

9. The mobile phone of claim 7, wherein:
the visual item comprises a video stream;
the first partial graphical output comprises a first portion of the video stream; and
the second partial graphical output comprises a second portion of the video stream.

10. The mobile phone of claim 7, wherein:
the visual item comprises a static image;
the first partial graphical output comprises a first portion of the static image; and
the second partial graphical output comprises a second portion of the static image.

* * * * *